United States Patent
Kamakura et al.

[11] Patent Number: 6,047,310
[45] Date of Patent: *Apr. 4, 2000

[54] INFORMATION DISSEMINATING APPARATUS FOR AUTOMATICALLY DELIVERING INFORMATION TO SUITABLE DISTRIBUTEES

[75] Inventors: Akira Kamakura, Kawasaki; Hideo Ōneda; Hideki Tanaka, both of Tokyo, all of Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/679,755

[22] Filed: Jul. 10, 1996

[30] Foreign Application Priority Data

Sep. 28, 1995 [JP] Japan .................................. 7-250816

[51] Int. Cl.⁷ .............................. G06F 13/00; G06F 13/10
[52] U.S. Cl. .......................... 709/201; 709/202; 709/203; 709/206; 709/217; 709/227; 709/228; 709/229
[58] Field of Search ........................ 398/200.01–200.03, 398/200.05, 200.07, 200.09, 610, 683, 200.3–200.33, 200.36, 200.46–200.5, 200.55, 200.59; 380/23, 25, 49, 4, 9, 12–13; 709/200–203, 206–207, 217–219, 225–229

[56] References Cited

U.S. PATENT DOCUMENTS

| | | | |
|---|---|---|---|
| 4,800,488 | 1/1989 | Agrawal et al. ..................... | 709/225 |
| 5,329,619 | 7/1994 | Page et al. .......................... | 709/203 |
| 5,367,681 | 11/1994 | Foss et al. .......................... | 709/303 |
| 5,513,126 | 4/1996 | Haskins et al. ..................... | 709/228 |
| 5,539,885 | 7/1996 | Ono et al. .......................... | 709/203 |
| 5,548,646 | 8/1996 | Aziz et al. .......................... | 713/153 |
| 5,557,320 | 9/1996 | Krebs ................................. | 709/206 |
| 5,557,721 | 9/1996 | Fite et al. ........................... | 709/217 |
| 5,678,041 | 10/1997 | Baker et al. ........................ | 709/229 |
| 5,694,546 | 12/1997 | Reisman ............................ | 709/217 |
| 5,694,616 | 12/1997 | Johnson et al. .................... | 709/207 |
| 5,757,510 | 5/1998 | Okada ................................ | 358/402 |
| 5,764,898 | 6/1998 | Tsuji et al. ......................... | 709/206 |

FOREIGN PATENT DOCUMENTS

WO 94/30000  12/1994  WIPO ........................ H04M 11/08

OTHER PUBLICATIONS

Search Report EP 96305148, Apr. 8, 1999.

*Primary Examiner*—Zarni Maung
*Assistant Examiner*—Bharat Barot
*Attorney, Agent, or Firm*—Staas & Halsey, LLP

[57] ABSTRACT

A receiver of advertisement information registers an advertisement reception requirement to a distribution host computer through a receiver terminal. A sender registers an advertisement transmission requirement to the distribution host computer through a sender terminal. The host computer references receiver attributes and desired categories of the advertisement recorded in the advertisement reception requirement, and categories and desired attributes for the receivers recorded in the advertisement transmission requirement, and generates a distribution list that satisfies both desire of the receiver and of the sender. An advertisement document is distributed to selected receivers corresponding to the distribution list.

31 Claims, 22 Drawing Sheets

| CATEGORY CODE | CATEGORY NAME |
|---|---|
| 0101001 | FURNITURE |
| 0101002 | TABLEWARE |
| 0101003 | HOME ELECTRIC APPARATUSES |
| ...... | ...... |
| 0102001 | MODELS |
| 0102002 | GAMES |
| 0201001 | PERSONAL COMPUTER MAIN BODIES |
| 0201002 | PERSONAL COMPUTER PERIPHERALS |
| 0201003 | SOFTWARE |
| ...... | ...... |

FIG. 6

| ITEM | CONTENT |
|---|---|
| DIRECT MAIL DISTRIBUTION SYSTEM ID | AUTOMATICALLY DESIGNATED BY SYSTEM |
| DATE OF BIRTH | DATE OF BIRTH |
| SEX | MALE OR FEMALE |
| OCCUPATION | OCCUPATION CATEGORY CODE |
| REGIDENTIAL AREA | AREA CODE |
| ACTION RANGE | AREA CODE (TWO OR MORE) |
| PRESENT AREA | AREA CODE |
| CATEGORY 1 | CATEGORY CODE |
| VALIDATION PERIOD OF CATEGORY 1 | VALIDATION PERIOD OF REQUEST |
| CATEGORY 2 | CATEGORY CODE |
| VALIDATION PERIOD OF CATEGORY 2 | VALIDATION PERIOD OF REQUEST |
| . . . . . . | . . . . . . |
| CATEGORY M | CATEGORY CODE |
| VALIDATION PERIOD OF CATEGORY M | VALIDATION PERIOD OF REQUEST |

FIG. 8

| ITEM | CONTENT |
|---|---|
| RECEIVER ID | DIRECT MAIL DISTRIBUTION SYSTEM ID |
| RECEIVING MEANS 1 | CODE OF RECEIVING MEANS |
| ADDRESS OF RECEIVING MEANS 1 | ADDRESS |
| RESTRICTION UNIT OF RECEIVING MEANS 1 | RECEPTION RESTRICTION UNIT=PIECE, BYTE |
| RESTRICTION PERIOD OF RECEIVING MEANS 1 | RECEPTION RESTRICTION PERIOD=DAY, WEEK |
| RESTRICTION AMOUNT OF RECEIVING MEANS 1 | RECEPTION RESTRICTION AMOUNT |
| TREATMENT AGAINST VIOLATION OF RESTRICTION OF RECEIVING MEANS 1 | RESTRICTION VIOLATION CODE |
| EXCEPTIONAL RECEPTION OF RECEIVING MEANS 1 | VALIDITY/INVALIDITY OF EXCEPTIONAL RECEPTION |
| ⋮ | ⋮ |
| RECEIVING MEANS N | CODE OF RECEIVING MEANS |
| ADDRESS OF RECEIVING MEANS N | ADDRESS |
| RESTRICTION UNIT OF RECEIVING MEANS N | RECEPTION RESTRICTION UNIT=PIECE, BYTE |
| RESTRICTION PERIOD OF RECEIVING MEANS N | RECEPTION RESTRICTION PERIOD=DAY, WEEK |
| RESTRICTION AMOUNT OF RECEIVING MEANS N | RECEPTION RESTRICTION AMOUNT |
| TREATMENT AGAINST VIOLATION OF RESTRICTION OF RECEIVING MEANS N | RESTRICTION VIOLATION CODE |
| EXCEPTIONAL RECEPTION OF RECEIVING MEANS N | VALIDITY/INVALIDITY OF EXCEPTIONAL RECEPTION |
| REJECTION OF RECEPTION | SENDER DIRECT MAIL DISTRIBUTING SYSTEM ID |

CODES OF RECEIVING MEANS
  1=FAX DATA
  2=VOICE MAIL
  3=ELECTRONIC MAIL
  4=VIDEO-ON-DEMAND DATA
  5=CONVENTIONAL MAIL

CODES OF VIOLATION AGAINST RESTRICTION
  1=REJECTION
  2=RECEPTION ON NEXT DAY OR LATER
  3=RECEPTION OF ONLY HEAD LINE/TITLE

FIG. 11

| ITEM | CONTENT |
|---|---|
| SENDER ID | DIRECT MAIL DISTRIBUTION SYSTEM ID |
| TRANSMISSION ADVERTISEMENT DOCUMENT NUMBER | MANAGEMENT SERIAL NUMBER OF TRANSMISSION ADVERTISEMENT DOCUMENT |
| VALIDATION PERIOD | VALIDATION PERIOD OF TRANSMISSION ADVERTISEMENT DOCUMENT |
| CATEGORY | DESIGNATED CATEGORY CODE |
| RETRIEVAL EXPRESSION | RETRIEVAL EXPRESSION FOR NARROWING SELECTION OF RECEIVERS |
| MAXIMUM NUMBER OF DISTRIBUTEES OF TRANSMISSION | MAXIMUM NUMBER OF RECEIVERS OF TRANSMISSION ADVERTISEMENT DOCUMENTS |
| DIVIDING DISTRIBUTION | VALIDITY/INVALIDITY |
| NUMBER OF SESSIONS OF DIVIDING DISTRIBUTION | NUMBER OF SESSIONS OF DIVIDING DISTRIBUTION |
| INTERVALS OF DIVIDING DISTRIBUTION | INTERVALS OF DIVIDING DISTRIBUTION |
| TRANSMISSION RESULT | NUMBER OF TRANSMISSION ADVERTISEMENT DOCUMENTS BEING SENT |
| DISTRIBUTION START DATE | MONTH/DAY/YEAR OF START OF DISTRIBUTION |
| STATUS | DISTRIBUTION STATUS = WAITING, EXECUTING, COMPLETED |

FIG. 13

| ITEM | CONTENT |
|---|---|
| SENDER ID | SENDER DIRECT MAIL DISTRIBUTION SYSTEM ID |
| TRANSMISSION ADVERTISEMENT DOCUMENT NUMBER | MANAGEMENT SERIAL NUMBER OF TRANSMISSION ADVERTISEMENT DOCUMENT |
| RECEIVER ID-1 | RECEIVER DIRECT MAIL DISTRIBUTION SYSTEM ID |
| TRANSMISSION RESULT-1 | TRANSMISSION RESULT |
| ⋮ | ⋮ |
| RECEIVER ID-J | RECEIVER DIRECT MAIL DISTRIBUTION SYSTEM ID |
| TRANSMISSION RESULT-J | TRANSMISSION RESULT |

FIG. 15

| ITEM | CONTENT |
|---|---|
| SENDER ID | DIRECT MAIL DISTRIBUTION SYSTEM ID |
| TRANSMISSION ADVERTISEMENT DOCUMENT NUMBER | MANAGEMENT SERIAL NUMBER OF TRANSMISSION ADVERTISEMENT DOCUMENT |
| TITLE | TITLE |
| BODY | DATA |
| SENDING MEANS | RECEIVING MEANS CODE OF TRANSMISSION ADVERTISEMENT DOCUMENT |

FIG. 16

| ITEM | CONTENT |
|---|---|
| COMPANY NAME (PERSON NAME) | COMPANY NAME OR PERSON NAME |
| ADDRESS | ADDRESS |
| TELEPHONE NUMBER | TELEPHONE NUMBER |
| FAX NUMBER | FAX NUMBER |
| COMPUTER NETWORK SUBSCRIBER ID | COMPUTER NETWORK SUBSCRIBER ID |
| DIRECT MAIL DISTRIBUTION SYSTEM SUBSCRIBER ID | AUTOMATICALLY DESIGNATED BY SYSTEM |
| COMPANY SUMMARY | DESCRIPTION OF COMPANY |
| CONCERNED COMMODITY CATEGORY | CATEGORY CODES (ONE OR MORE) |

FIG. 17

| ITEM | CONTENT |
|---|---|
| SENDER ID | DIRECT MAIL DISTRIBUTION SYSTEM ID |
| TRANSMISSION COMPLETION ID | RECEIVER DIRECT MAIL DISTRIBUTION SYSTEM ID (ONE OR MORE) |

FIG. 18

| ITEM | CONTENT |
|---|---|
| RECEIVER ID | DIRECT MAIL DISTRIBUTION SYSTEM ID |
| NUMBER OF RECORDS OF TRANSMISSION COMPLETED | NUMBER OF RECORDS OF ADVERTISEMENT INFORMATION TRANSMITTED |

FIG. 19

INFORMATION DISSEMINATING APPARATUS FOR AUTOMATICALLY DELIVERING INFORMATION TO SUITABLE DISTRIBUTEES

BACKGROUND OF THE INVENTION

1. Field of the Invention

The present invention relates to an information providing apparatus for automatically determining the distribution of information such as electronic mail, voice mail, video-on-demand data, facsimile data, and conventional mail, received by a receiver from a sender, and a method thereof.

2. Description of the Related Art

In recent years, as computer networks have grown in size and personal computers have become more common, mass-marketing systems using computer communications have been attempted. As examples of such mass-marketing, vendors that provide commodities, services, and so forth may send direct mail such as electronic messages including advertisement information to users. A user receives this direct mail and accesses the content thereof. If the user wants a commodity or the like featured in the direct mail, he or she will order it by a predetermined method.

However, the conventional distributing method for distributing advertisement information has the following problems.

Since a sender of direct mail almost unconditionally sends advertisement information to all subscribers of the computer network, even users who have received the direct mail may not access the contents thereof. In addition, even if the users access the contents of the direct mail, they may not be interested in the commodities featured in the direct mail and may not order them. Thus, the hit ratio of the advertisement for the sender is very low.

Further, advertisement information is one-directionally sent to the users of the computer network, even if the users have not required the advertizing information. Thus, users have to spend a lot of time handling the advertisement information. When the users continuously receive large amounts of advertisement information on vendors or commodities or the like, in which the users are not interested, the user's burden further increases.

SUMMARY OF THE INVENTION

An object of the present invention is to provide an information providing apparatus for effectively restricting distributees for various types of information transmitted by senders and a method thereof.

The present invention includes an information providing apparatus for performing a process for distributing non-specific information from a sender to a receiver, a storing medium, and a method thereof.

The information providing apparatus according to the present invention includes an inputting unit, a processing unit, a distributing unit, a storing unit, a confirming unit, and a replying unit.

According to an aspect of the present invention, the inputting unit inputs an information reception requirement and an information transmission requirement. The information reception requirement includes receiver attributes of a receiver and the desired conditions of the information to be transmitted. The information reception requirement is designated by the receiver. The information transmission requirement includes information attributes of information to be transmitted and the desired conditions of a sender for receivers. The information transmission requirement is designated by the sender.

When the information attributes satisfy the desired conditions for the information and the receiver attributes satisfy the desired conditions for the receivers, the processing unit allows the distribution of the information from the sender to the receivers.

The receiver attributes and the desired conditions of the sender for the receivers are input to the information providing apparatus by the inputting unit. The processing unit determines whether or not the receiver attributes accord with the desired conditions of the senders. The receiver attributes are attributes of receivers such as age, sex, and occupation. The sender inputs the desired conditions for these attributes. The processing unit can select receivers that satisfy the desired conditions of the sender.

The information attributes and the desired conditions of the receivers for the information are input from the inputting unit. The processing unit can determine whether or not the information attributes satisfy the desired conditions of the receivers. The information attributes are attributes of information to be sent such as a type of information, a category, and a validation period. A receiver inputs the desired conditions for these attributes. The processing unit can select a sender of information that satisfies the desired conditions of the receivers.

According to another aspect of the present invention, the inputting unit inputs type information of commodities or services designated by a receiver from predetermined commodity or service category information. The processing unit selects advertisement information of commodities or services corresponding to the type information input. The distributing unit distributes the selected advertisement information to the receivers. Thus, the receiver receives only the advertisement information that he or she wants to receive and can refuse advertisement information that he or she does not want.

According to another aspect of the present invention, the inputting unit inputs a dividing condition for dividing the distribution of advertisement information for a plurality of receivers into a plurality of sessions. The distributing unit distributes the advertisement information in a plurality of sessions corresponding to the dividing condition. Thus, the distributing process for distributing advertisement information to many receivers can be divided into any number of sessions.

According to another aspect of the present invention, the storing unit stores a profile of the sender. The distributing unit distributes the profile along with advertisement information when the sender initially sends the advertisement information to the receiver. Thus, the receiver can know about the commodities and so forth of a sender from which the receiver receives advertisement information.

According to another aspect of the present invention, the inputting unit inputs a validation period for the advertisement information, the validation period being designated by the sender in a predetermined unit such as a particular time or a particular period. The processing unit prohibits the distribution of the advertisement information when the validation period has expired. Thus, the sender can only distribute valid advertisement information.

According to another aspect of the present invention, the inputting unit inputs a reception restriction designated by the receiver, the reception restriction restricting amount of advertisement information received by the receiver in a predetermined period. The processing unit allows the distribution of advertisement information in the extent of the reception restriction. Thus, the sender can only distribute advertisement information to a receiver such that, for example, it does not exceed the capacity of the mail box of the receiver.

According to another aspect of the present invention, the inputting unit inputs a type of advertisement information that the receiver wants and a plurality of types that the sender designates. The processing unit compares a type of advertisement information that the receiver wants with a combination of a plurality of types of information and selecting distributees from a plurality of receivers. Thus, the sender can select a receiver who wants two or more types of commodities or services such as "cars" and "houses", and send advertisement information thereof.

According to another aspect of the present invention, the confirming unit electronically confirms that the receiver has received the advertisement information and accessed the content thereof. The replying unit automatically generates confirmation information that represents that the receiver has accessed the content of the advertisement information and sends the confirmation information to the distributing unit or the sender terminal.

For example, the confirming unit confirms not only that the advertisement information is distributed to a receiver terminal by electronic mail, but also that the receiver has accessed the content of the advertisement information. The confirmation information is sent from the replying unit to the distributing unit. Thus, the distributing unit can confirm that the receiver has accessed the content of the advertisement information. Accordingly, the sender can obtain confirmation information from the distributing unit or the replying unit. This confirmation information can be used for charging the sender for the distribution service of the advertisement information.

These and other objects, features and advantages of the present invention will become more apparent in light of the following detailed description of a best mode embodiment thereof, as illustrated in the accompanying drawings.

BRIEF DESCRIPTION OF THE INVENTION

FIG. 6 is a schematic diagram showing a commodity/service category table;

FIG. 8 is a schematic diagram showing an example of an advertisement reception requirement;

FIG. 11 is a schematic diagram showing an example of a receiving means registration table;

FIG. 13 is a schematic diagram showing an example of an advertisement transmission requirement;

FIG. 15 is a schematic diagram showing an example of a distribution list;

FIG. 16 is a schematic diagram showing an example of a transmission advertisement document;

FIG. 17 is a schematic diagram showing an example of a sender profile;

FIG. 18 is a schematic diagram showing an example of transmission completion management information;

FIG. 19 is a schematic diagram showing an example of reception restriction information;

DESCRIPTION OF THE PREFERRED EMBODIMENTS

Next, with reference to the accompanying drawings, an embodiment of the present invention will be described.

Figure 1:
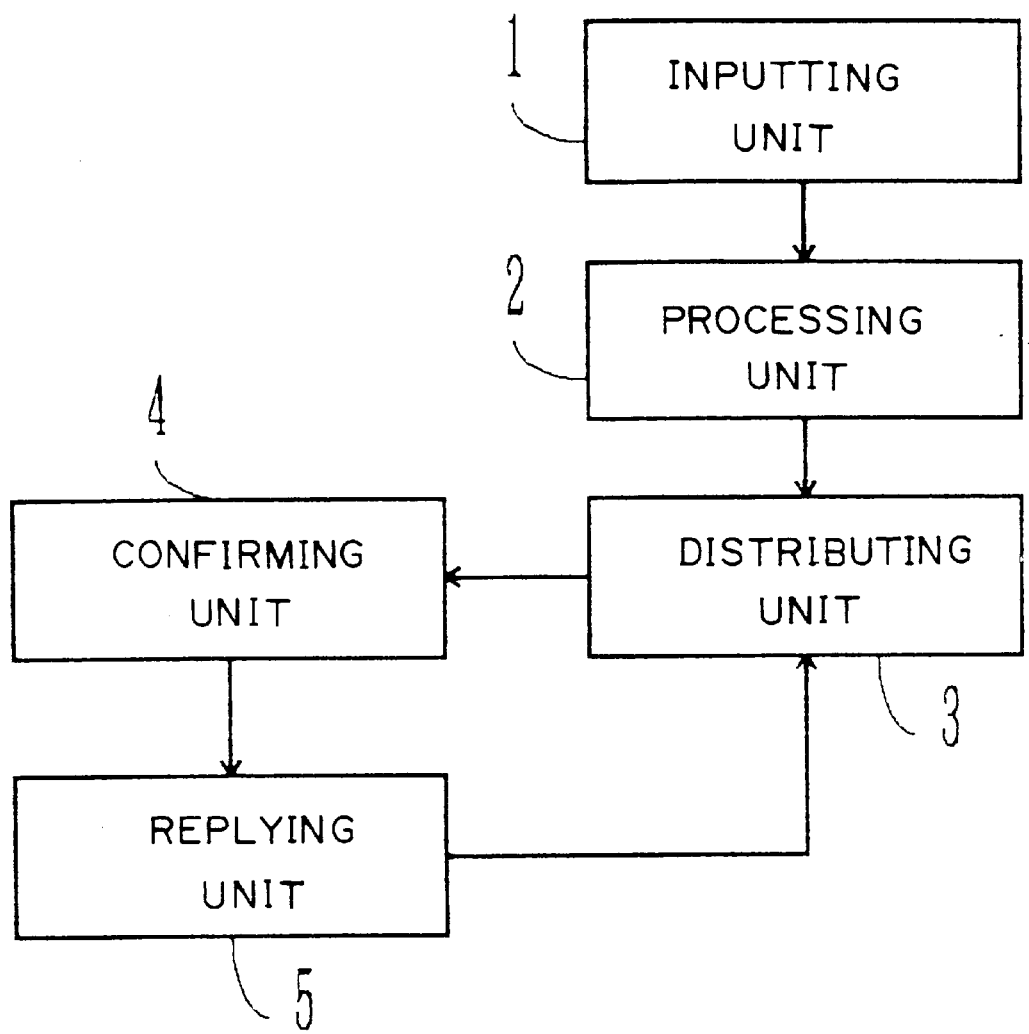
FIG. 1 is a block diagram showing the theory of an information providing apparatus according to the present invention.

FIG. 1 is a block diagram showing the principle of an information providing apparatus according to the present invention. The information providing apparatus shown in FIG. 1 comprises an inputting unit 1, a processing unit 2, a distributing unit 3, a confirming unit 4, and a replying unit 5.

The inputting unit 1 inputs an information reception requirement and an information transmission requirement. The information reception requirement includes receiver attributes of a receiver and desired conditions of information to be transmitted. The information reception requirement is designated by the receiver. The information transmission requirement includes information attributes of information to be transmitted and desired conditions of a sender for receivers. The information transmission requirement is designated by the sender. When the information attributes satisfy the desired conditions for the information and the receiver attributes satisfy the desired conditions for the receivers, the processing unit 2 allows the distribution of the information from the sender to the receivers.

The receiver attributes and the desired conditions of the sender for the receivers are input to the information providing apparatus by the inputting unit 1. The processing unit 2 determines whether or not the receiver attributes accord with the desired conditions of the senders. The receiver attributes are attributes of receivers such as age, sex, and occupation. The sender inputs the desired conditions for these attributes. The processing unit 2 can select receivers that satisfy the desired conditions of the sender.

The information attributes and the desired conditions of the receivers for the information are input from the inputting unit 1. The processing unit 2 can determine whether or not the information attributes satisfy the desired conditions of the receivers. The information attributes are attributes of information being sent such as a type of information, a category, and a validation period. A receiver inputs the desired conditions against these attributes. The processing unit 2 can select a sender of information that satisfies the desired conditions of the receivers.

Moreover, the inputting unit 1 inputs first type information of commodities or services designated by a receiver from predetermined commodity or service category information. The processing unit 2 selects advertisement information of commodities or services corresponding to the first type information being input. The distributing unit 3 distributes the selected advertisement information to the receivers.

The commodity or service category information includes types of advertisement information to be sent in the form of a list or a thesaurus. A receiver inputs the first type information that designates one or more types of the advertisement information. The processing unit 2 designates the type of commodities or services that the receiver wants from the category information corresponding to the first type information. The distributing unit 3 distributes the advertisement information corresponding to the type to the receiver. Thus, the receiver can receive only the advertisement information that he or she wants to receive and can refuse advertisement information that he or she does not want.

When the receiver has received the advertisement information from the distributing unit 3 and has accessed the content thereof, the confirming unit 4 electronically confirms this. The replying unit 5 automatically generates confirmation information that represents that the receiver has accessed the content and sends back the confirmation information to the distributing unit 3 or the sender terminal.

For example, in addition to the distribution of advertisement information to the receiver terminal by electronic mail, the confirming unit 4 can confirm that the receiver has accessed the content. The replying unit 5 sends the confirmation information to the distributing unit 3. Thus, the distributing unit 3 can confirm that the receiver has seen the advertisement information. Accordingly, the sender can obtain the confirmation information from the distributing unit 3 or the replying unit 5. The confirmation information may be used for the fees for the distribution services of the advertisement information.

Figure 2:
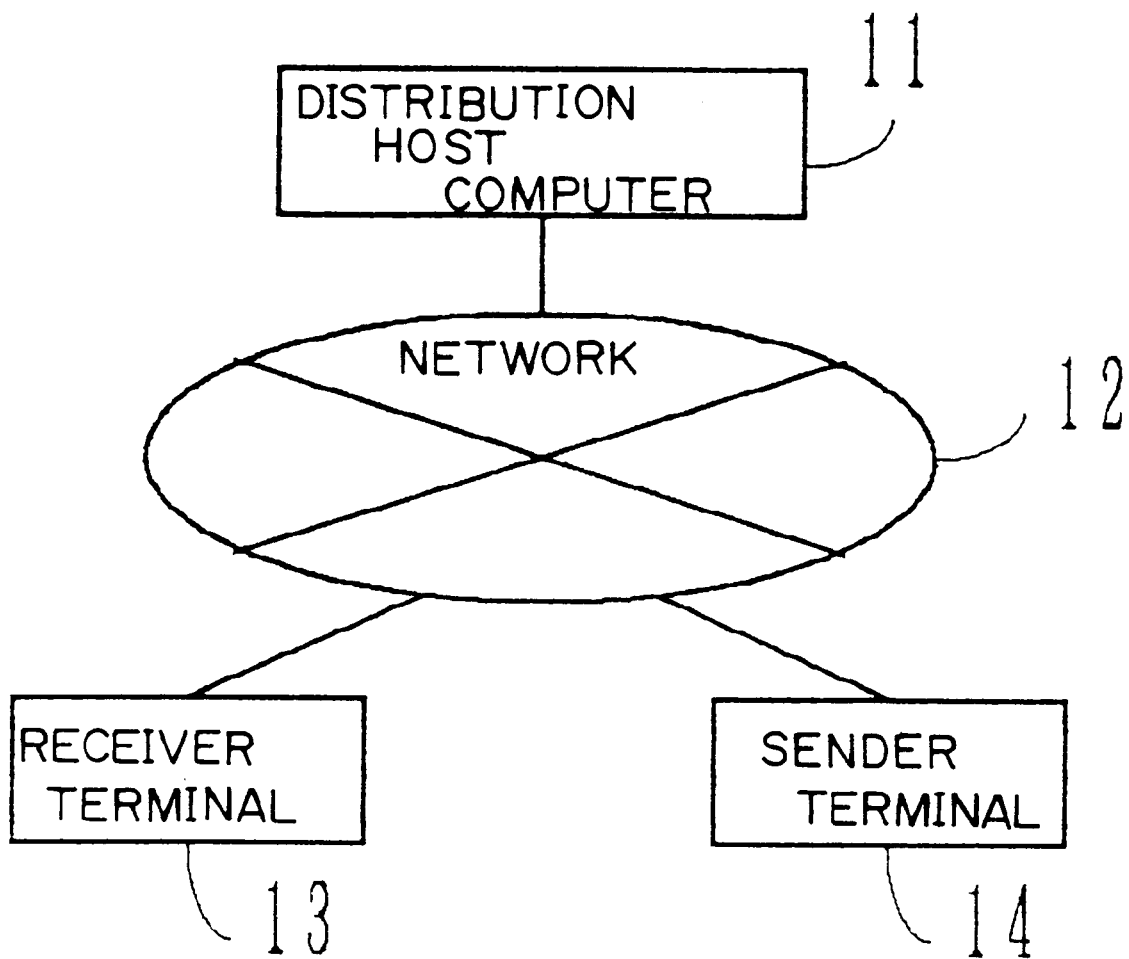
FIG. 2 is a schematic diagram showing a structure of a system according to an embodiment of the present invention.

For example, the inputting unit shown in FIG. 1 accords with an inputting/outputting unit for a network 12 of a distribution host computer 11 or an inputting unit of each of a receiver terminal 13 and a sender terminal 14 shown in FIG. 2. In addition, the processing unit 2 accords with a distribution list generating portion 23 shown in FIG. 3. The distributing unit 3 accords with an advertisement information distributing portion 27. The confirming unit 4 and the replying unit 5 accord with a CPU (central processing unit) of the receiver terminal 13. These structures will be described in the following.

FIG. 2 is a schematic diagram showing a structure of a system according to an embodiment of the present invention. In FIG. 2, a distribution host computer 11, a receiver terminal 13, and a sender terminal 14 are connected to a communication network 12. The sender terminal 14 is a computer terminal of a vendor of commodities, services, or the like. The receiver terminal 13 is a computer terminal of another user of the network. Generally, a plurality of receiver terminals 13 and a plurality of sender terminals 14 are connected to the network 12. The distribution host computer 11 designates senders and receivers who send and receive advertisement information corresponding to various information received from the receiver terminals 13 and the sender terminals 14.

Figure 3:
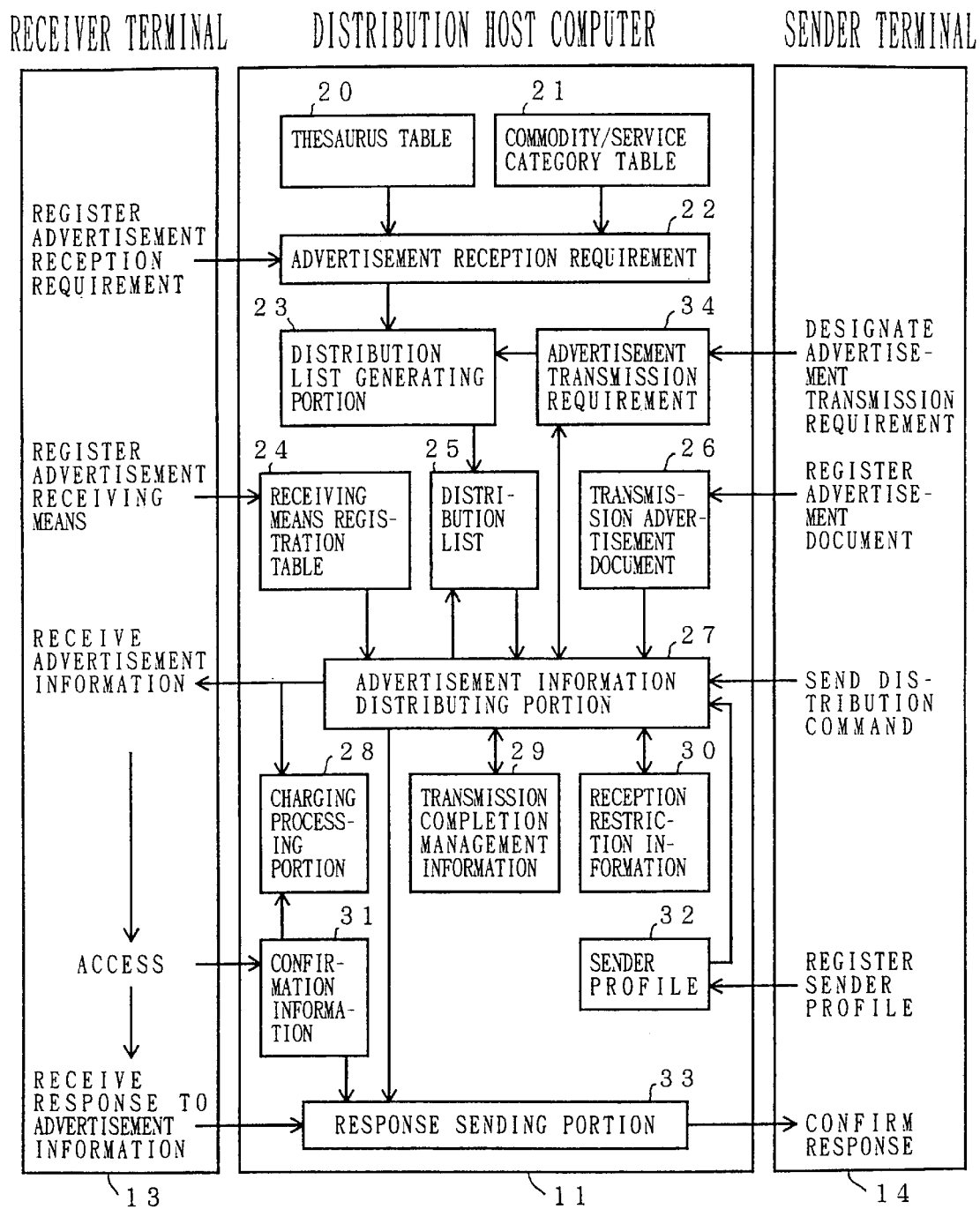
FIG. 3 is a block diagram showing a structure of a distributing host computer.

FIG. 3 is a block diagram showing a structure of the distribution host computer 11 and a flow of information exchanged between the distribution host computer 11 and the receiver terminal 13 or the sender terminal 14. The distribution host computer 11 shown in FIG. 3 comprises a distribution list generating portion 23, an advertisement information distributing portion 27, a charging processing portion 28, and a response sending portion 33. The distribution host computer 11 stores a thesaurus table 20, a commodity/service category table 21, an advertisement reception requirement 22, an advertisement transmission requirement 34, a receiving means registration table 24, a distribution list 25, a transmission advertisement document 26, transmission completion management information 29, reception restriction information 30, confirmation information 31, and a sender profile 32.

The distribution list generating portion 23 and the charging processing portion 28 are realized by the function of the CPU in the distribution host computer 11. The thesaurus table 20, the commodity/service category table 21, the advertisement reception requirement 22, the advertisement transmission requirement 34, the receiving means registration table 24, the distribution list 25, the transmission advertisement document 26, the transmission completion management information 29, the reception restriction information 30, the confirmation information 31, and the sender profile 32, are stored in a memory or a disk unit of the distribution host computer 11. The structure of the advertisement information distributing portion 27 and the response sending portion 33 depends on the communication mode. When electronic mail is used for communication, these portions are realized by the CPU of the distribution host computer 11. When voice mail is used for communication, these portions are realized by the CPU and a telephone terminal. When facsimile data is used for communication, these portions are realized by the CPU and a FAX terminal. When conventional mail is used for communication, these portions are realized by the CPU and a conventional mail service.

Next, with reference to FIGS. 4 and 5, a flow of an information distributing process in a direct mail distributing system having the distribution host computer 11 shown in FIG. 3 will be described.

Figure 4:
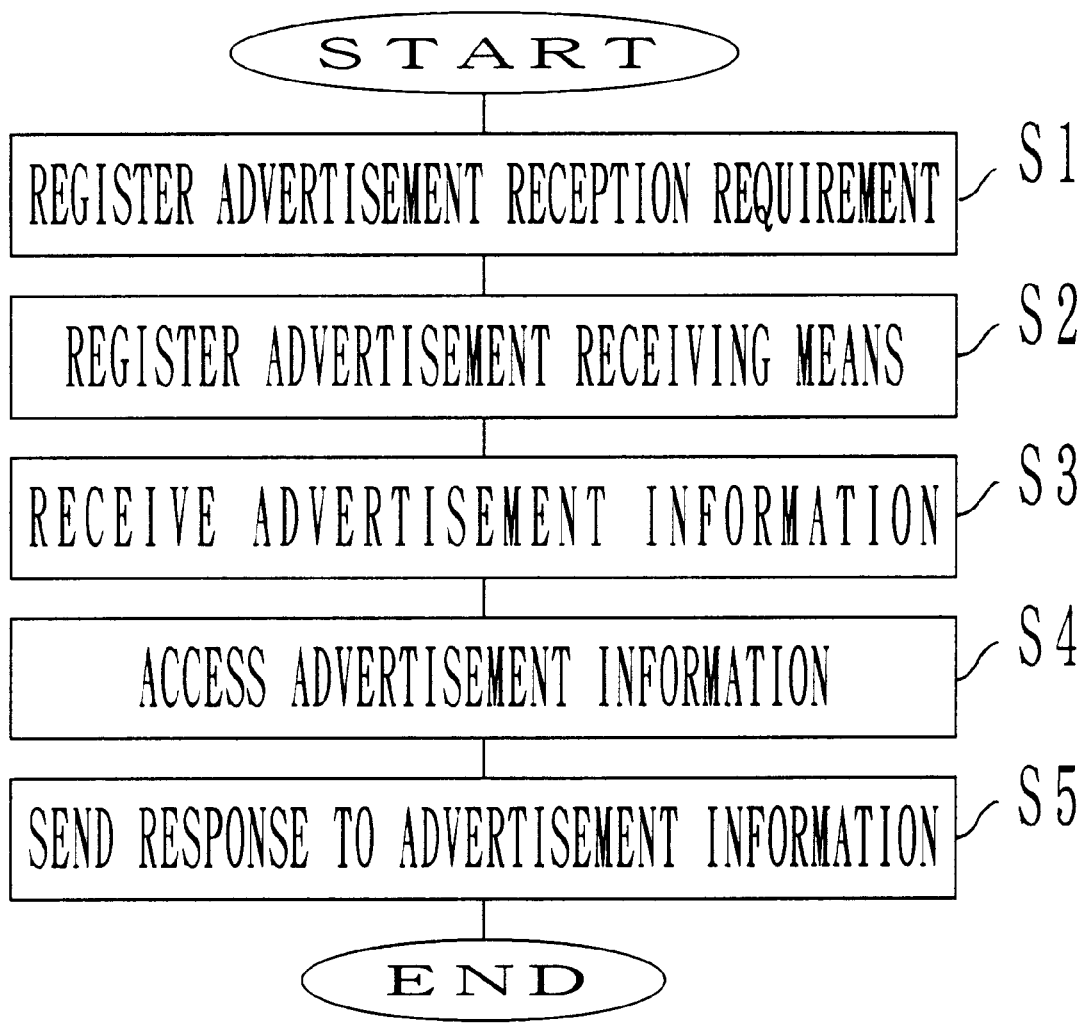
FIG. 4 is a flow chart showing a process of a receiver terminal.

FIG. 4 is a flow chart showing the process of the receiver terminal 13. In FIG. 4, when the process is started, the receiver terminal 13 registers the advertisement reception requirement 22 designated by the user as the receiver to the distribution host computer 11 (at step S1). In addition, the receiver terminal 13 registers an advertisement receiving means (advertisement reception mode) to the receiving means registration table 24 (at step S2). The advertisement reception requirement 22 represents attributes of the receiver and desired conditions of the receiver for the advertisement information. The advertisement receiving means represents a distribution mode that the receiver requires. When the advertisement reception requirement 22 is registered, if necessary, the thesaurus table 20 or the commodity/service category table 21 is used.

In the case that the designated advertisement receiving means is electronic mail sent through the network 12, when the receiver receives advertisement information of the sender from the advertisement information distributing portion 27 (at step S3), the receiver accesses the content of the advertisement information (at step S4). The receiver terminal 13 electronically confirms that the receiver has accessed the content. The access to the advertisement information by the receiver is confirmed when the receiver has performed an operation for displaying the content of the electronic mail on the screen. The receiver terminal 13 automatically generates the confirmation information 31 that represents that the receiver has accessed the content of the advertisement information and sends back the confirmation information 31 to the distribution host computer 11. When the receiver generates electronic mail in reply to the advertisement information, the receiver terminal 13 sends the electronic mail to the response sending portion 33 (at step S5). As a result, the process is completed.

When the designated advertisement receiving means is other than electronic mail, the process performed by the receiver is basically the same as the above-described process. However, in this case, the confirmation information is not always generated. In addition, the response is not always sent by electronic mail.

Figure 5:
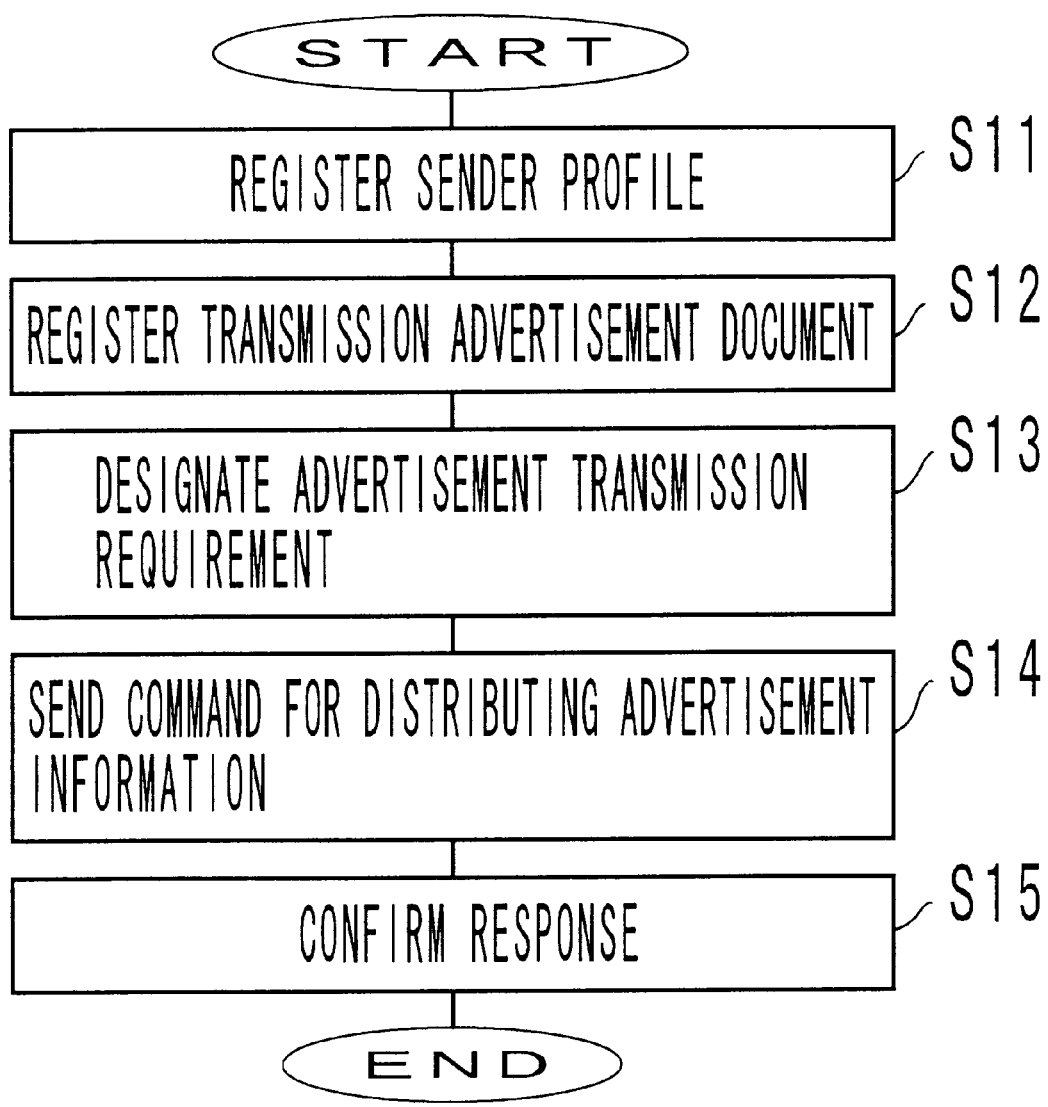
FIG. 5 is a flow chart showing a process of a sender terminal.

FIG. 5 is a flow chart showing the process of the sender terminal 14. In FIG. 5, when the process is started, the sender terminal 14 registers the sender profile 32 generated by the provider who is the sender and the transmission advertisement document 26 to the distribution host computer 11 (at steps S11 and S12). The transmission profile 32 represents a simple description of the sender and a summary of commodities and so forth that the sender provides. The transmission advertisement document 26 includes a detailed description of the individual commodities and the like. The advertisement information is not always document data. Instead, the advertisement information may contain picture data and voice data.

Thereafter, the sender terminal 14 sends the advertisement transmission requirement 34 designated by the sender to the distribution list generating portion 23 (at step S13) so as to cause the advertisement information distributing portion 27 to distribute the advertisement information (at step S14). The advertisement transmission requirement 34 represents attributes of the advertisement information and the desired conditions of the sender for the receivers. In addition, the advertisement transmission requirement 34 functions as an advertisement information management ledger for the sender. The sender confirms the response that the response sending portion 33 sends back (at step S15). As a result, the process is completed. When the response is sent by electronic mail, the sender can confirm the response on the sender terminal 14.

On the other hand, the distribution list generating portion 23 of the distribution host computer 11 determines distributees of the advertisement information corresponding to the advertisement reception requirement 22 and the advertisement transmission requirement 34 and generates the distribution list 25. When the advertisement information distributing portion 27 receives a distribution command from the sender terminal 14, the advertisement information distributing portion 27 distributes the transmission advertisement document 26 and the sender profile 32 with reference to the advertisement transmission requirement 34, the receiving means registration table 24, the distribution list 25, the transmission completion management information 29, and the reception restriction information 30. The advertisement information distributing portion 27 records the transmission result to the distribution list 25, and the distribution start date and the number of pieces of transmitted advertisement to the advertisement transmission requirement 34. The advertisement information distributing portion 27 sends information of the sender of the distributed advertisement information to the charging processing portion 28 and the response sending portion 33. The response sending portion 33 sends the status of the response that represents whether or not the receiver has received the advertisement information and has accessed the content thereof, to the sender.

The charging processing portion 28 charges the sender for the advertisement information when it has been distributed to the receiver. When the charging processing portion 28 receives the confirmation information 31, the charging processing portion 28 additionally charges the sender for the advertisement information. Since the charging process is divided into the two stages in which the advertisement information is distributed and the access is confirmed, distribution fees can be designated so that the fee for the distribution to receivers who access the contents of advertisement information is higher than the fee for the distribution to receivers who only receive the advertisement information.

Next, with reference to FIGS. 6 to 10, the registering process of the advertisement reception requirement 22 will be described.

Figure 7:
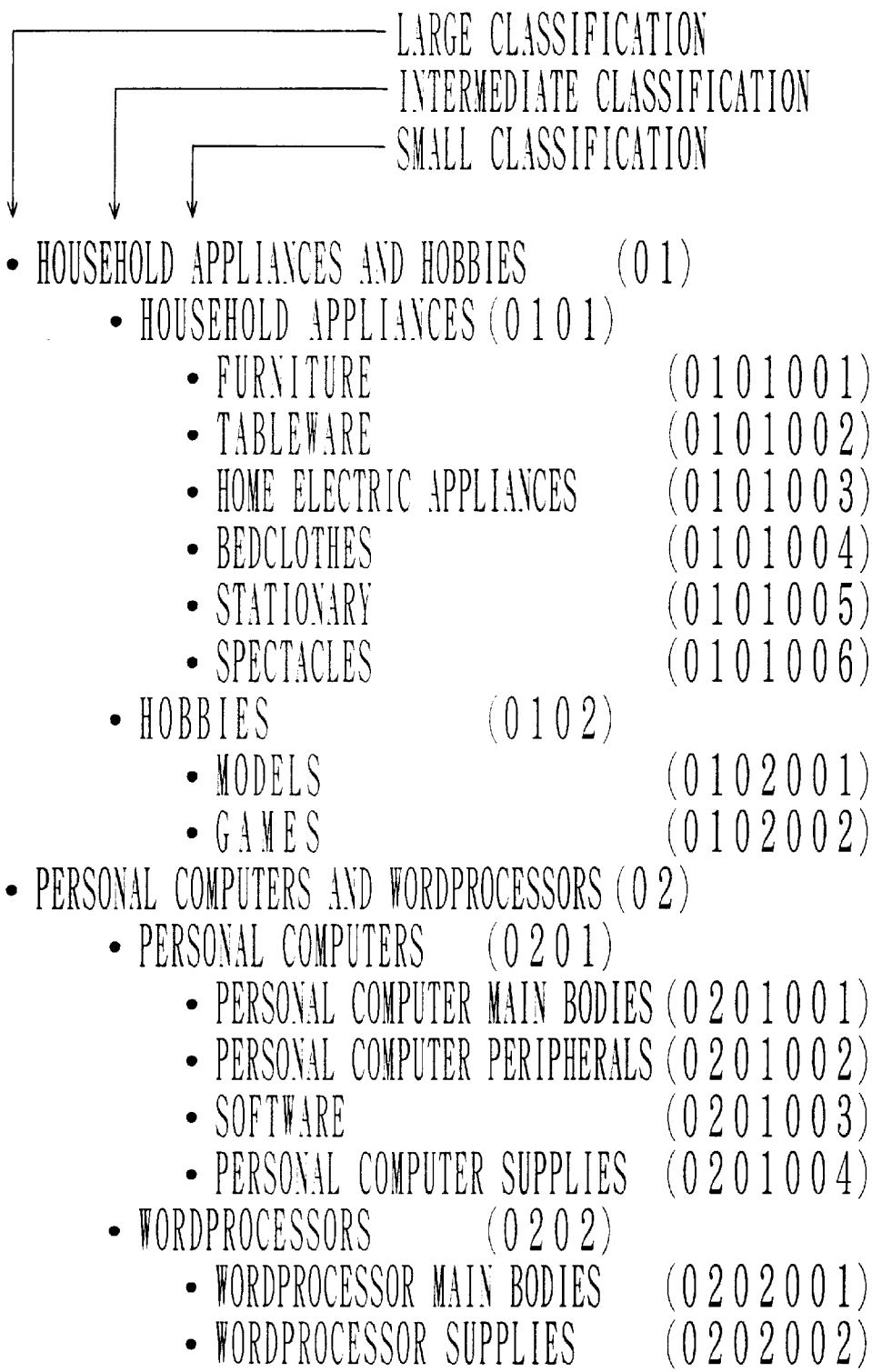
FIG. 7 is a schematic diagram showing an example of a thesaurus table.

FIGS. 6 and 7 show examples of a commodity/service category table 21 and a thesaurus table 20 that are referenced when the advertisement reception requirement 22 is registered. The commodity/service category table shown in FIG. 6 stores category names of commodities or services and category codes corresponding thereto. For example, the category code of the category name "furniture" is "0101001". The thesaurus table shown in FIG. 7 is used to retrieve a category name and a category code corresponding to a word designated by the receiver. The thesaurus table has three levels of classification: large classification, intermediate classification, and small classification.

FIG. 8 is a schematic diagram showing an example of the advertisement reception requirement 22. In the advertisement reception requirement 22, the fields "direct mail distribution system ID", "date of birth", "sex", "occupation", "residential area", "action range", and "present area", represent personal attribute information of the receiver. The fields "category i" and "validation period of category i" (where i=1, 2, . . . , M), represent the type of the advertisement information and the conditions thereof. The field "direct mail distribution system ID" stores an identification automatically designated by the distribution host computer 11 for the receiver. The field "occupation" stores an occupation category code. The fields "residential area", "action range", and "present area" store respective area codes. The action range represents a daily movement range. The present area represents the latest position of the terminal that can receive advertisement information. The fields "category i" and "validation period of category i" store a category code of the commodity/service category table 21 and the validation period of the advertisement reception requirement of the category, respectively.

When information of the present location of a personal terminal such as a portable telephone or a personal handyphone system (PHS) of the receiver is stored as the present area, it can be used to narrow the selection of the distributees of the advertisement information. For example, voice mail that announces a limited special offer of a supermarket can be distributed to receivers who are present near the store in a predetermined time zone corresponding to the offer. When a validation period for each category is designated, a desired category can be changed seasonally. In addition, after a predetermined time period elapses, the distribution of advertisement information in a predetermined category can be automatically stopped.

Figure 9:
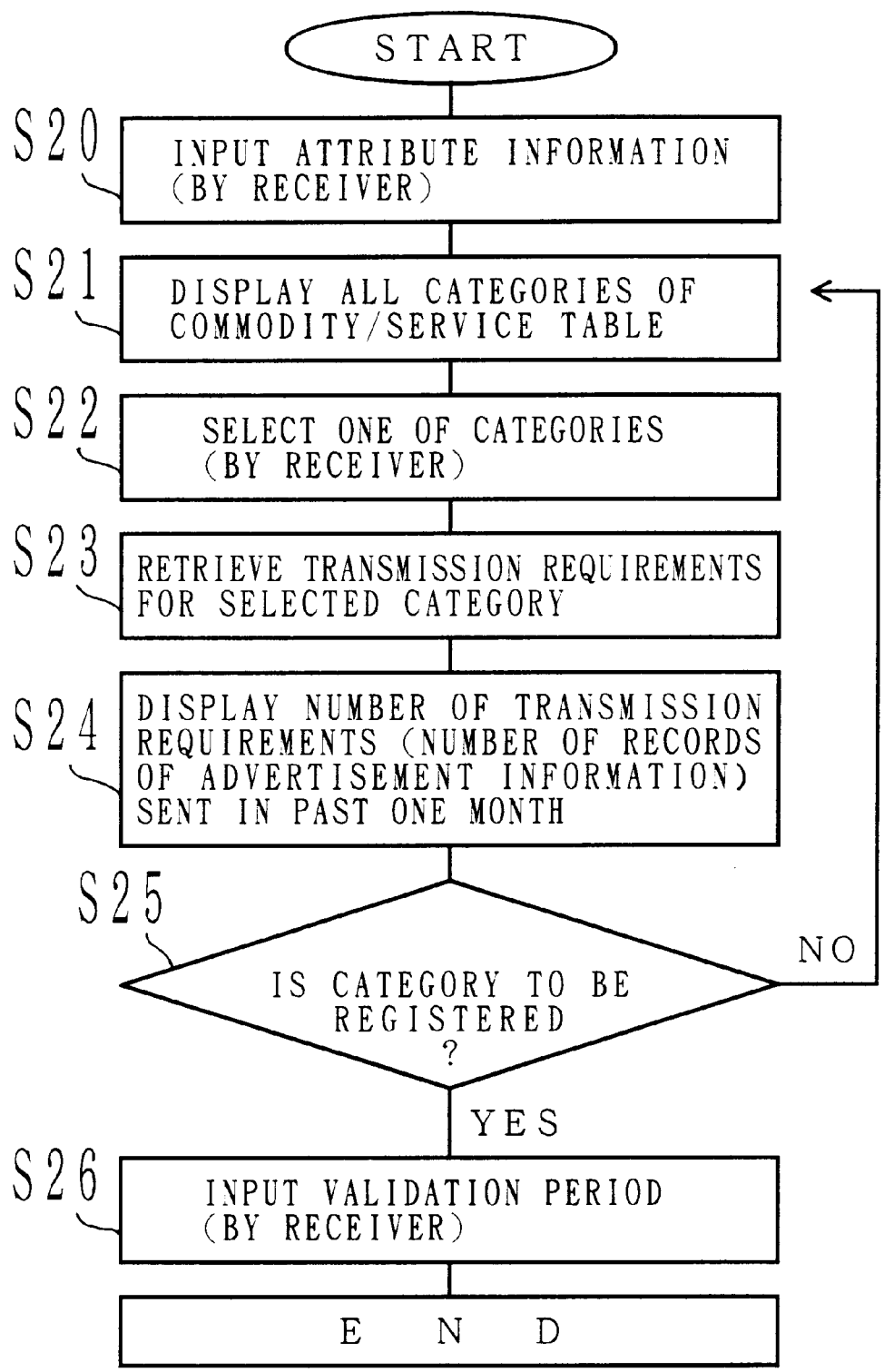
FIG. 9 is a flow chart showing a first advertisement reception requirement registering process.

FIG. 9 is a flow chart showing a first advertisement reception requirement registering process performed by the receiver terminal 13 and the distribution host computer 11. In the first advertisement reception requirement registering process, the commodity/service category table 21 is used. In FIG. 9, when the process is started, the receiver inputs attribute information such as date of birth on the receiver terminal 13 (at step S20). Thereafter, the distribution host computer 11 displays all categories of the commodity/service category table 21 on the screen of the receiver terminal 13 (at step S21).

When the receiver selects one of the categories being displayed (at step S22), the distribution host computer 11 retrieves the advertisement transmission requirements 34 that have been stored with a key of the category being selected (at step S23). The distribution host computer 11 displays the number of the advertisement transmission requirements 34 (the number of records of advertisement information) that have been sent in a predetermined period for the category (at step S24). The distribution host computer 11 prompts the receiver to register the selected category as the desired category (at step S25). In this example, the predetermined period is one month. The receiver can consider the number of times the advertisement information has been sent that is being displayed as a barometer of the popularity of the information.

When the receiver wants to register the category, he or she inputs the validation period for receiving the advertisement information of the category (at step S26). As a result, the process is completed. When the receiver does not want to register the category, the flow returns to step S21.

At step S22, if the receiver designates a category that is not contained in the commodity/service category 21, the distribution host computer 11 may add the designated category as a new category to the commodity/service category table 21.

Figure 10:
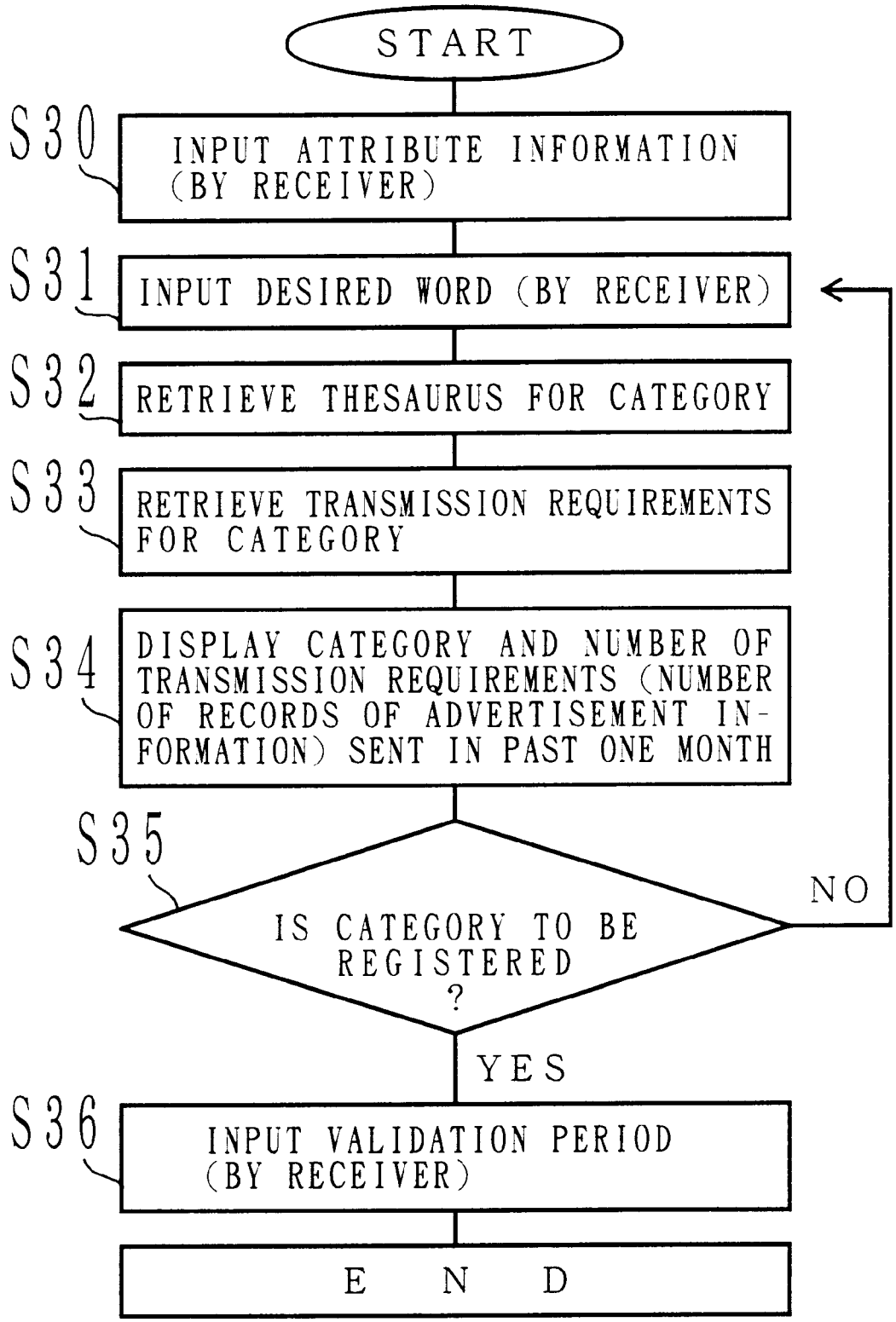
FIG. 10 is a flow chart showing a second advertisement reception requirement registering process.

FIG. 10 is a flow chart showing a second advertisement reception requirement registering process performed by the receiver terminal 13 and the distribution host computer 11. In the second advertisement reception requirement registering process, the thesaurus table 20 is used. In FIG. 10, when the process is started, the receiver inputs attribute information such as date of birth on the receiver terminal (at step S30). Thereafter, the receiver inputs a keyword for advertisement information that the receiver wants to receive (at step S31). Next, the distribution host computer 11 retrieves the thesaurus table 20 for the category corresponding to the input keyword (at step S32).

In the case that the thesaurus table shown in FIG. 7 is used, when the input word is "household appliances", all category names included in the large classification "household appliances and hobbies" are output as the retrieval result. When the input word is "furniture", only the single category "furniture" in the small classification is output as the retrieval result.

Next, the distribution host computer 11 retrieves advertisement transmission requirements 34 that have been stored with a key of the category corresponding to the input word (at step S33). The distribution host computer 11 displays the number of advertisement transmission requirements (number of records of advertisement information) of the advertisement sent in a predetermined period for the category on the screen of the receiver terminal 13 (at step S34). The distribution host computer 11 prompts the receiver for the registration of the category as the desired category (at step S35). In this example, the predetermined period is one month. When there are a plurality of categories that accords with the keyword, the number of records of the advertisement information is displayed for each category.

When the receiver wants to register the category, he or she inputs a validation period for receiving the advertisement information of the category (at step S36). As a result, the process is completed. When the receiver does not want to register the category, the flow returns to step S31.

When the receiver inputs a word that is not included as a category name in the thesaurus table 20, the distribution host computer 11 may add the input word as a new category name to the thesaurus table 20.

By the first advertisement reception requirement registering process shown in FIG. 9 or the second advertisement reception requirement registering process shown in FIG. 10, the advertisement reception requirement 22 is generated. Next, the receiving means registering process will be described with reference to FIGS. 11 and 12.

FIG. 11 is a schematic diagram showing an example of the receiving means registration table 24. In the receiving means registration table shown in FIG. 11, a field "receiver ID" stores a receiver direct mail distribution system ID designated by the distribution host computer 11. A field "receiving means i" (where i=1, 2, . . . , N) stores a code of a receiving means with an i-th priority. Normally, the advertisement information is distributed in the mode designated by the receiving means 1. Codes 1, 2, 3, 4, and 5 of the receiving means represent the receiving means (distribution mode) of the advertisement information, by facsimile data, voice mail, electronic mail, video-on-demand data, and conventional mail, respectively. It should be noted that these receiving means can be also sub-categorized in such a manner that a plurality of codes may be used corresponding to a plurality of electronic mail systems.

A field "address of receiving means i" stores the address of a receiver terminal or the like of a receiver. When the receiving means is a facsimile, a facsimile number is stored. When the receiving means is voice mail, a telephone number is stored. When the receiving means is electronic mail, a computer network subscriber ID is stored. When the receiving means is a video-on-demand system, a subscriber ID is stored. When the receiving means is conventional mail, an address is stored.

A field "restriction unit of receiving means i" stores the unit of the reception restriction amount of the receiving means. The restriction unit is, for example, the number of pieces of mail received in a predetermined unit period (for example, per week) or the number of bytes. A field "restriction period of receiving means i" stores a desired period of the reception by the receiving means in units of days or weeks. A field "restriction amount of receiving means i" stores the amount of information receivable by the receiving means corresponding to the restriction unit. In the case of electronic mail, the capacity of the mail box of the receiver can be used as the restriction amount. Alternatively, the restriction amount of the receiving means i may be designated by the user.

A field "restriction violation treatment of receiving means i" stores a restriction violation code that represents the treatment in the case that a restriction period or a restriction amount of the receiving means is violated. When the restriction violation code is "1", the reception of the advertisement information is rejected. When the restriction violation code is "2", the advertisement information is received on the next day or later. When the restriction violation code is "3", only a head line (or a title) of the advertisement information is received. A field "exceptional reception of receiving means i" stores a flag that represents whether or not the advertisement information is received as an exception in the case that the restriction of the receiving means is violated. When the receiver wants such exceptional reception, the flag is "YES". Otherwise, the flag is "NO".

A field "reception rejection" at the lowest line of the table stores a sender direct mail distribution ID from which the receiver wants to reject the reception of advertisement information. Thus, when the field "reception rejection" is designated, the receiver can reject the reception of direct mail from a sender that the receiver has designated.

Figure 12:
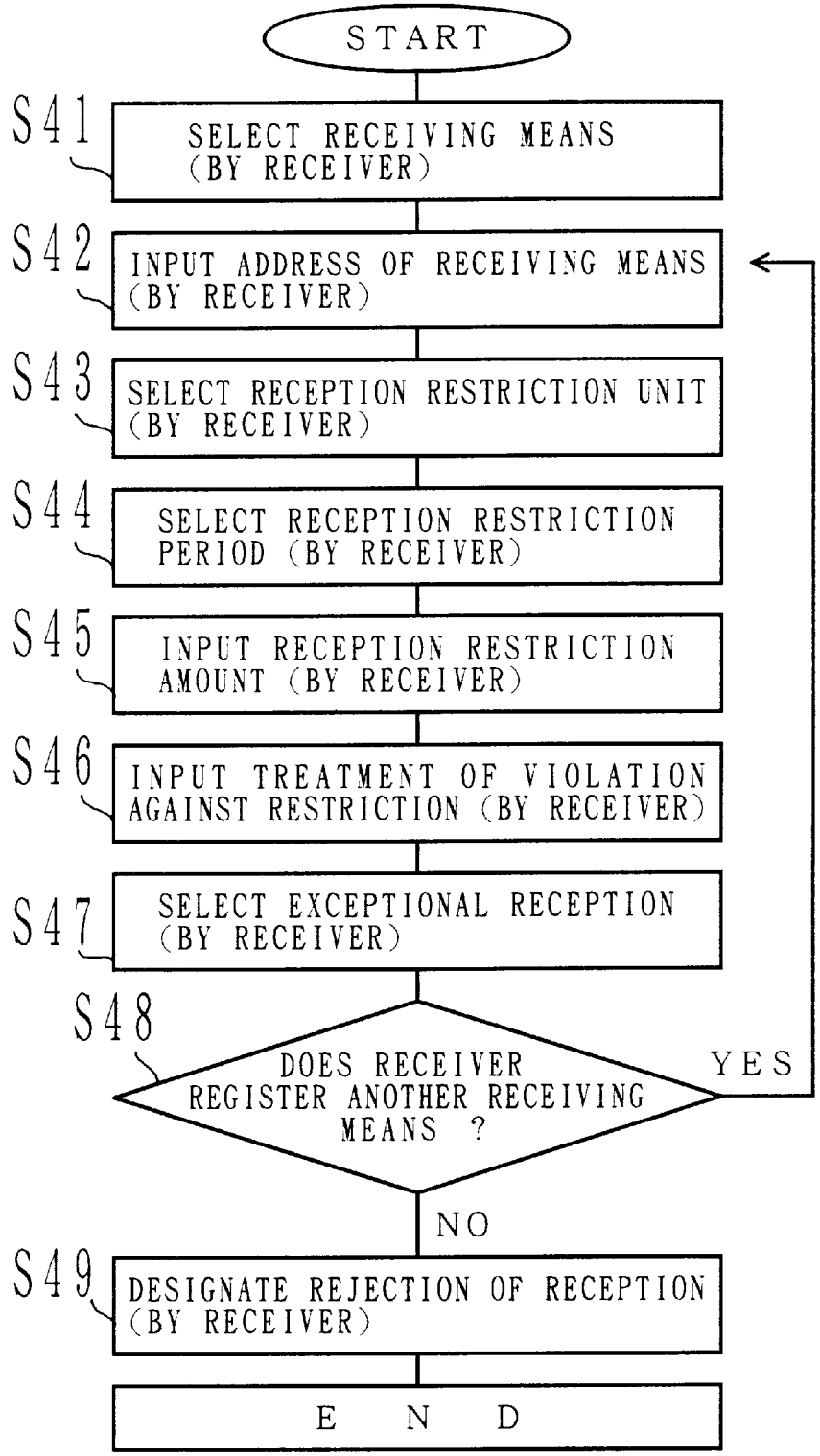
FIG. 12 is a flow chart showing a receiving means registering process.

FIG. 12 is a flow chart showing the receiving means registering process performed by the receiver terminal 13 and the distribution host computer 11. In FIG. 12, when the process is started, the receiver selects one of the receiving means (at step S41) and inputs an address of the selected receiving means (at step S42). The selected receiving means is registered as a receiving means 1 on the receiving means registration table 24. The input address is stored as an address of the receiving means 1.

Thereafter, the receiver selects a reception restriction unit (at step S43) and a reception restriction period (at step S44). After that, the receiver inputs a reception restriction amount (at step S45) and the treatment of any violation against the restriction (at step S46). The selected reception restriction unit is stored as the restriction unit of the receiving means 1. The selected reception restriction period is stored as the restriction period of the receiving means 1. The input reception restriction amount is stored as the restriction amount of the receiving means 1. The input treatment of any violation against the restriction is stored as the treatment of any violation against the restriction of the receiving means 1. Thereafter, the receiver selects the validity/invalidity of the exceptional reception (at step S47). The selected result is stored as the exceptional reception of the receiving means 1.

The distribution host computer 11 prompts the receiver for the registration of another receiving means (at step S48). When the receiver wants to register another receiving means, the flow returns to step S41. When the steps S41 to S47 are repeated, a plurality of receiving means are stored in the receiving means registration table 24 in the order of higher priority. When the receiver does not want to register another receiving means, he or she designates a sender from which he or she wants to reject the reception of information (at step S49). As a result, the process is completed.

Next, with reference to FIGS. 13 to 15, the registering process for the advertisement transmission requirement 34 will be described.

FIG. 13 is a schematic diagram showing an example of the advertisement transmission requirement 34. In the advertisement transmission requirement shown in FIG. 13, fields "sender ID", "transmission advertisement document number", "validation period", and "category" represent attributes of advertisement information. A field "retrieval expression" represents desired conditions of a receiver for a sender. Fields "maximum number of sessions of transmission", "dividing distribution", "number of session of dividing distribution", and "intervals of dividing distribution" represent distribution conditions for advertisement information. Fields "transmission result", "distribution start date", and "status" represent management information of the distributing process.

The field "sender ID" stores a sender direct mail distribution system ID. The field "transmission advertisement document number" stores a serial number (management serial number) of the transmission advertisement document 26. The field "validation period" stores a valid period of the transmission advertisement document 26. The field "category" stores a category code of advertisement information designated by a sender. The validity period may be designated with a predetermined time period from several seconds, several minutes, and several hours, to several days and several weeks. The field "retrieval expression" stores aggregate expressions for narrowing the selection of receivers. The aggregate expressions are composed of a combination of logical expressions (formulas) of AND and OR of attribute information of the receiver and desired categories. By designating the aggregate expressions, the sender can freely select distributees for the advertisement information.

The field "maximum number of distributees of transmission" stores the maximum number of receivers of the transmission advertisement documents 26. The field "dividing distribution" stores a flag that represents the validity/invalidity of the dividing distribution. The dividing distribution represents that advertisement information is distributed to many distributees in a plurality of sessions. The fields "number of sessions of dividing distribution" and "intervals of dividing distribution" store the number of sessions of dividing transmission and the intervals of dividing distribution, respectively. When a sender wants to distribute 1000 items of direct mail in 10 sessions, he or she designates "10" and "1" to "number of sessions of dividing distribution" and "intervals of dividing distribution", respectively. When the sender designates the dividing distribution in such a manner, he or she can distribute advertisement information to a predetermined number of distributees in predetermined intervals.

The field "transmission result" stores the number of transmission advertisement documents 26 being sent whenever the advertisement information distributing portion 27 performs the distributing process. The field "distribution start date" stores the date (month/day/year) on which a distribution of a transmission advertisement statement 26 is started. The field "status" stores the current status of the distribution such as "waiting", "executing", or "completed". With the management information, the number of transmission advertisement documents 26 that correspond to a specific category and that have been sent in a specific period in the past can be obtained.

Figure 14:
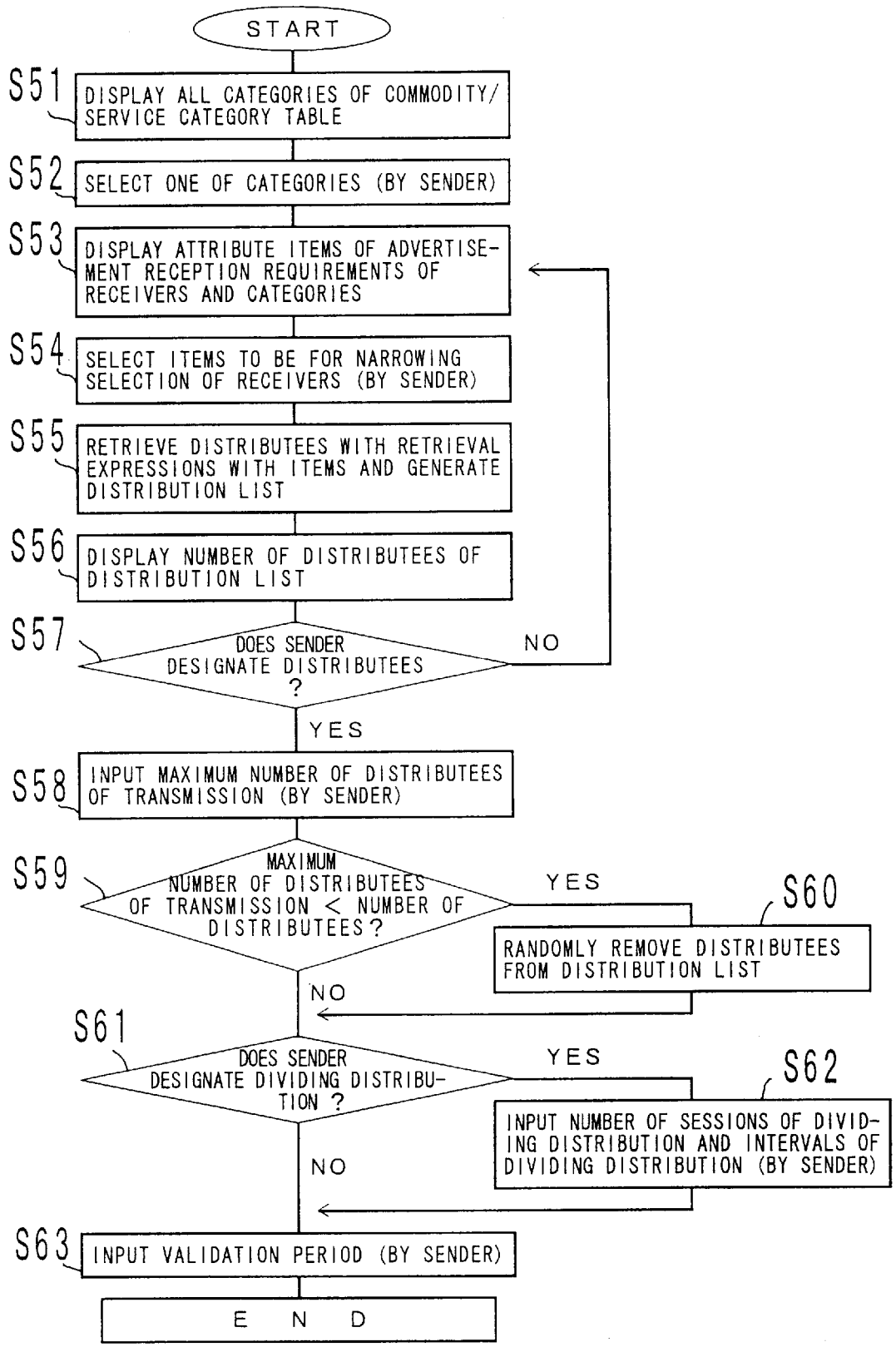
FIG. 14 is a flow chart showing an advertisement transmission requirement registering process.

FIG. 14 is a flow chart showing the advertisement transmission requirement registering process performed by the sender terminal 14 and the distribution list generating portion 23. In FIG. 14, when the process is started, the distribution list generating portion 23 displays all categories of the commodity/service category table 21 on the screen of the sender terminal 14 (at step S51). When the sender selects one of the categories being displayed (at step S52), the distribution list generating portion 23 retrieves advertisement reception requirements 22 of receivers with a key of the selected category, and displays the advertisement reception requirements 22 corresponding to the category. The distribution list generating portion 23 displays items of attribute information of the advertisement reception requirements 22 and the designated category (at step S53).

When the sender selects attribute information and categories so as to narrow the selection of receivers (at step S54), the distribution list generating portion 23 retrieves advertisement reception requirements 22 with aggregate expressions composed of the item being selected and generates a distribution list 25 (shown in FIG. 15) including receiver IDs corresponding to the retrieval conditions (at step S55). In the case that advertisement reception requirements 22 are stored in a relational database, when the distribution list generating portion 23 sends an inquiry composed of retrieval expressions to the database, a desired advertisement reception requirement 22 can be automatically retrieved. In the distribution list shown in FIG. 15, the sender ID and the transmission advertisement document number are the same as those of the advertisement transmission requirement shown in FIG. 13. A field "receiver ID—i" (where i=1, 2, . . . , J) stores an i-th receiver direct mail distribution system ID. A field "transmission result—i" stores a transmission result of an i-th receiver.

Thus, the sender can designate a category of advertisement information to be transmitted. In addition, the sender can designate category names of which receivers want to receive advertisement information. For example, in the case that a sender wants to send direct mail about cars, when a sender designates "cars" and "household appliances" as category names at step S54, he or she can send the direct mail only to receivers who want to receive direct mail about "cars" and "household appliances". In this case, the sender can designate three or more category names.

Next, the distribution list generating portion 23 displays the number of distributees included in the generated distribution list 25 (at step S56) and prompts the sender for the determination of the distributees (at step S57). When the sender does not accept the displayed number of distributees, the flow returns to step S53. When the sender accepts the number of the distributees, the distribution list generating portion 23 compares the maximum number of distributees of the transmission that was input with the number of distributees on the distribution list 25 (at step S59). When the number of distributees is larger than the maximum number of distributees of the transmission, the distribution list generating portion 23 randomly removes distributees from the distribution list 25 (at step S60). Thereafter, the distribution list generating portion 23 prompts the sender for the designation of the dividing distribution (at step S61). When the number of distributees is equal to or less than the maximum number of distributees of the transmission, the flow advances to step S61.

When the sender designates the dividing distribution, he or she inputs the number of sessions of the dividing distribution and intervals of the dividing distribution (at step S62). Thereafter, the sender inputs the validation period (at step S63). As a result, the process is completed. When the sender does not designate the dividing distribution at step S61, the flow advances to step S63.

At step S56, statistical data such as the number of receivers who want to receive advertisement information for each designated category and their attribute information, may be displayed on the screen of the sender terminal 14. Thus, the sender can determine distributees with reference to the statistical information being displayed.

Next, with reference to FIGS. 16 to 22, the advertisement information distributing process will be described.

FIG. 16 is a schematic diagram showing an example of a transmission advertisement document 26. In the transmission advertisement document shown in FIG. 16, fields "sender ID" and "transmission advertisement document number" are the same as those of the advertisement transmission requirement shown in FIG. 13. A field "title" stores a title (head line) of a transmission advertisement document generated by a sender. A field "body" stores data of the content of the transmission advertisement document. This data is not limited to text data, but may also be picture data and/or voice data. A field "sending means" stores a receiving means code of a transmission advertisement document designated by the sender.

FIG. 17 is a schematic diagram showing an example of a sender profile 32. In the sender profile shown in FIG. 17, a field "company name (person name)" stores a company name or a sender name. Fields "telephone number", "FAX number", "computer network subscriber ID", and "direct mail distribution system subscriber ID", store respective information about the sender. A field "company summary" stores a summary of the company. A field "concerned commodity category" stores at least one category code of commodities/services provided by the sender. With the sender profile 32, the contact information for the sender can be sent to receivers. Thus, the receivers can easily contact the sender.

FIG. 18 is a schematic diagram showing an example of a transmission completion management information 29. The transmission completion management information shown in FIG. 18 is generated for each sender. A field "sender ID" stores a sender direct mail distribution system ID. A field "transmission completion ID" stores direct mail distribution system IDs of all receivers to which the sender has sent advertisement information. With the transmission completion management information 29, the sender can distinguish receivers to which he or she has sent advertisement information from other receivers.

FIG. 19 is a schematic diagram showing an example of a reception restriction information 30. The reception restriction information 30 shown in FIG. 19 is generated for each receiver. A field "receiver ID" stores a receiver direct mail distribution system ID. A field "number of records of transmission completed" stores the number of records of advertisement information sent in the mode of a receiving means 1 registered by the receiver. In this case, the sender of the advertisement information is not specified. With the reception restriction information 30 and the receiving means registration table 24, it can be determined whether or not the number of records of transmission to the receiving means reaches the reception restriction amount.

Figure 20:
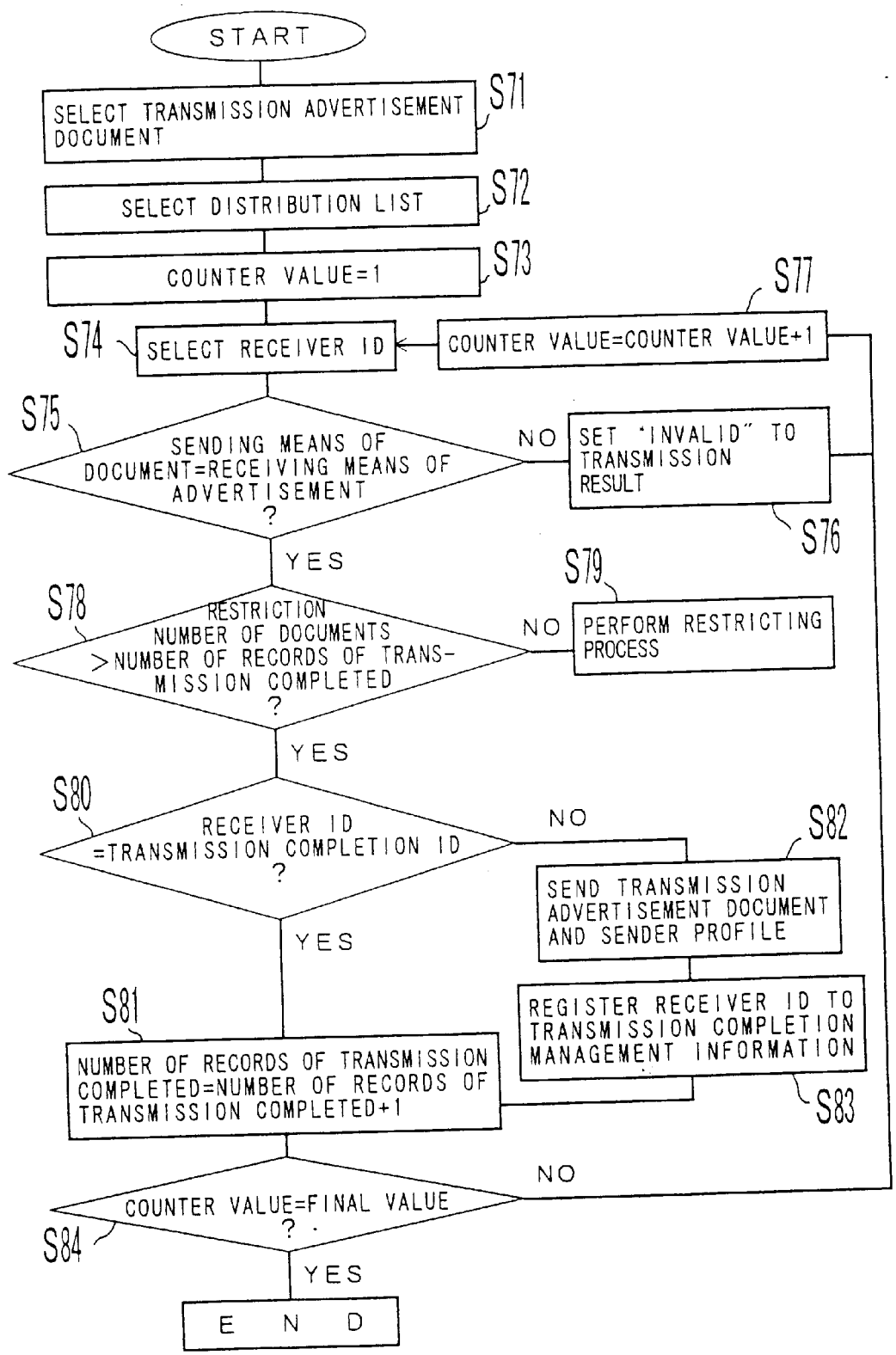
FIG. 20 is a flow chart showing an advertisement information distributing process.

FIG. 20 is a flow chart showing an advertisement information distributing process performed by the advertisement information distributing portion 27. When the process is started corresponding to a distribution command received from a sender, the advertisement information distributing portion 27 selects a transmission advertisement document 26 that is an original document corresponding to a designated transmission advertisement document number (at step S71) and selects a distribution list 25 (at step S72). Thereafter, the advertisement information distributing portion 27 sets "1" to a counter (at step S73) and selects one of the receiver IDs on the distribution list 25 in ascending order (at step S74). Thereafter, the advertisement information distributing portion 27 references the receiving means registration table 24 corresponding to the selected receiver ID and determines whether or not the receiving means 1 of the receiving means registration table 24 accords with the sending means recorded for the transmission advertisement document (at step S75). When they do not match, the advertisement information distributing portion 27 sets "invalid" to the transmission result of the distribution list 25 corresponding to the receiver ID of the distribution list 25 (at step S76), increments the counter value by "1" (at step S77), and selects the next receiver ID (at step S74).

When the receiving means 1 accords with the sending means at step S75, the advertisement information distributing portion 27 references the reception restriction information 30 of the receiver and compares the number of records of transmission completed and the restriction number of documents to be received (reception restriction amount) in the receiving means 1 (at step S78). When the number of records of transmission completed is equal to the reception restriction amount, the advertisement information distributing portion 27 performs the restricting process (at step S79).

When the number of records of transmission completed is less than the reception restriction amount, the advertisement information distributing portion 27 references the transmission completion management information 29 of the sender and determines whether or not the transmission completion IDs include the selected receiver ID (at step S80). When the receiver ID accords with one of the transmission completion IDs, the advertisement information distributing portion 27 sends only the transmission advertisement document 26 to the receiver and increments the number of records of transmission completed of the reception restriction information 30 by "1" (at step S81). When the receiver ID does not accord with any transmission completion ID, the advertisement information distributing portion 27 sends the transmission advertisement document 26 and the sender profile 32 to the receiver, adds the receiver ID to the transmission completion IDs of the transmission completion management information 29 (at step S82), and increments the number of records of transmission completed of the reception restriction information 30 (at step S83).

Next, the advertisement information distributing portion 27 determines whether or not the counter value is the final value (at step S84). When the counter value is not the final value, the advertisement information distributing portion 27 increments the counter value by "1" (at step S77). Thereafter, the flow returns to step S74. When the counter value becomes the final value, the process is completed.

When a communicating means designated by a receiver accords with a communicating means designated by a sender and a restriction amount designated by the receiver is not violated, the normal distributing process is performed. When the restriction amount is violated, the restricting process is performed. When a sender initially sends an advertisement to a new receiver, the sender profile 32 is automatically added to the transmission advertisement document 26 to be sent.

Figure 21:
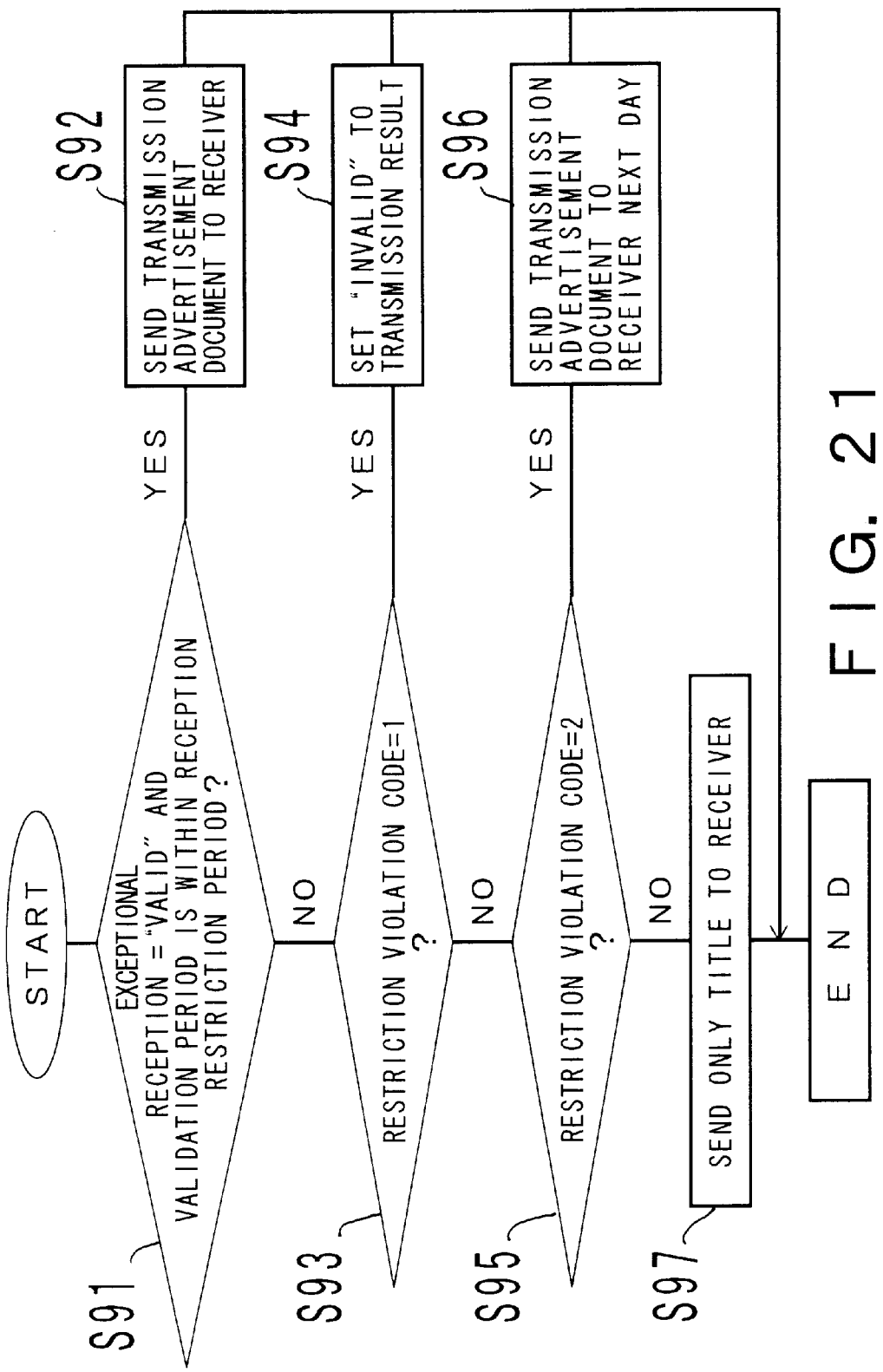
FIG. 21 is a flow chart showing a restricting process.

FIG. 21 is a flow chart showing the restricting process performed at step S79 shown in FIG. 20. In FIG. 21, when the process is started, the advertisement information distributing portion 27 reads an exceptional reception value and a restriction period (reception restriction period) of the receiving means 1 from the receiving means registration table 24 of the receiver. In addition, the advertisement information distributing portion 27 reads a validation period from the advertisement transmission requirement 34 of the sender. The advertisement information distributing portion 27 determines whether or not the exceptional reception is "valid" and the validation period is "today" and has not expired (at step S91). When the determined result is "YES", the advertisement information distributing portion 27 sends the transmission advertisement document 26 to the receiver as the exceptional process (at step S92). As a result, the process is completed. When the determined result is "NO", the advertisement information distributing portion 27 determines whether or not the restriction violation code of the receiving means 1 is "1" (at step S93).

When the restriction violation code is "1", the advertisement information distributing portion 27 sets "invalid" to the transmission result of the receiver on the distribution list 25 (at step S94). As a result, the process is completed. When the restriction violation code is not "1", the advertisement information distributing portion 27 determines whether or not the restriction violation code is "2" (at step S95). When the restriction violation code is "2", the advertisement information distributing portion 27 sends the transmission advertisement document 26 the next day (at step S96). As a result, the process is completed. When the restriction violation code is not "2", the advertisement information distributing portion 27 sends only the title of the transmission advertisement document 26 (at step S97). As a result, the process is completed.

According to the restricting process, the receiver can exceptionally receive advertisement information whose validation period will soon be expired even when the restriction is violated. And a process designated with the restriction violation code shown in FIG. 11 can be automatically performed.

Figure 22:
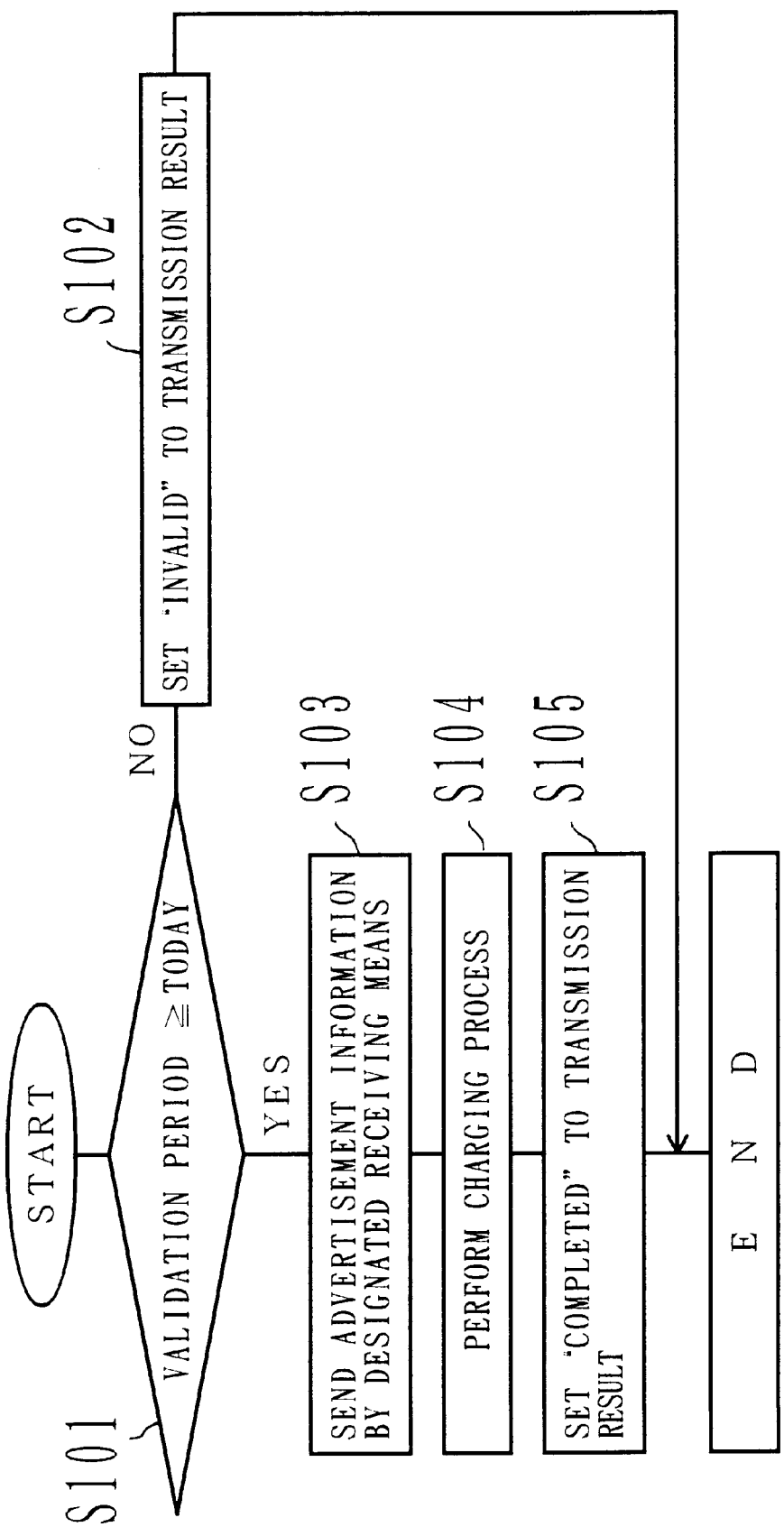
FIG. 22 is a flow chart showing a sending process.

FIG. 22 is a flow chart showing the sending process performed at steps S81 and S82 shown in FIG. 20 and steps S92 and S96 shown in FIG. 21. In FIG. 22, when the process is started, the advertisement information distributing portion 27 references the advertisement transmission requirement 34 of the sender and determines whether or not the current date exceeds the validation period (at step S101). When the current date exceeds the validation period, the advertisement information distributing portion 27 sets "invalid" to the transmission result of the receiver on the distribution list 25 (at step S102). As a result, the process is completed. When the current date does not exceed the validation period, the advertisement information distributing portion 27 sends the transmission advertisement document 26 to the receiver in the designated mode of the receiving means 1 of the receiving means registration table 24 (at step S103). Thereafter, the charging processing portion 28 charges the sender ID for the distribution fee (at step S104). The advertisement information distributing portion 27 sets "completed" to the transmission result (at step S105). As a result, the process is completed.

According to the sending process, the distribution of advertisement information that exceeds the validation period designated by the sender is automatically stopped. The validation period can be freely designated by the sender. In addition, the validation period that has expired can be extended by the sender.

When advertisement information cannot be sent in the mode of the receiving mean 1 due to the expiration of the restriction period of the receiving means 1, the advertisement information can be sent in another mode registered as receiving means 2 or so on in the receiving means registration table 24. In this case, the priority is lowered from the receiving means 1 to the receiving means N. For each receiving means, the determinations at steps S75 and S78 are performed. In addition, the reception restriction information 30 as shown in FIG. 19 is generated for each receiving means so as to manage the number of records of transmission completed for each receiving means.

According to the above-described embodiment, the receiver and the sender can freely change the advertisement reception requirement 22, the receiving means registration table 24, and the advertisement transmission requirement 34. In addition, the receiver and the sender can newly input the advertisement reception requirement 22, the receiving means registration table 24, and the advertisement transmission requirement 34. In this case, the advertisement information distributing portion 27 automatically performs the distributing process corresponding to the changed information or newly input information.

When the advertisement reception requirement 22 is registered, the distribution host computer 11 can provide the receiver with desired categories or the like of advertisement reception requirements 22 that have been registered, and the receiver can register the provided categories or the like as his or her advertisement reception requirements 22. At this point, a first receiver may retrieve an advertisement reception requirement 22 of another receiver that has the same attribute information as that input by the first receiver, and register the retrieved result as the advertisement reception requirement 22 of the first receiver. In addition, a receiver may select a desired one of standard advertisement reception requirements 22 that have been previously prepared and stored in the distribution host computer 11.

Moreover, in addition to distributing advertisement information to the receiver terminal 13, the advertisement information distributing portion 27 may distribute items of an advertisement reception requirement 22 corresponding to a desired condition designated as a retrieval expression by the sender along with advertisement information. For example, when advertisement information is distributed by electronic mail, the related items are displayed on the screen of the receiver terminal 13 along with the transmission advertisement document 26.

In the embodiment, only the distributing process of the advertisement information of the vender who is a sender was described. However, the present invention can be applied to any information provided from a sender to a receiver.

According to the present invention, a sender can register desired conditions for receivers, thereby arbitrarily restricting the distributees of the information. When a receiver registers desired conditions for information to be received, he or she can receive such selected information. Thus, an information distribution that satisfies both the sender side requirement and the receiver side requirement can be realized. In particular, in the case of the advertisement information, higher hit rates can be expected. Consequently, the present invention can significantly contribute to target marketing.

In addition, since personal information such as date of birth, sex, electronic mail address, and telephone number of each receiver, are managed by the host computer and the sender side cannot know this information, the privacy of the receiver side can be protected and an anonymity of the receiver is maintained.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An information providing apparatus for use in an information processing system for distributing information from a sender to receivers, comprising:

inputting means for inputting information reception requirements and an information transmission requirement, each information reception requirement including a receiver attribute of one of the receivers and a desired condition of the one of the receivers for direct mail information, the information reception requirement being designated by and transmitted from the one of the receivers, the information transmission requirement including an information attribute of the direct mail information and a desired condition of the sender for the receivers, the information transmission requirement being designated by and transmitted from the sender;

determining means for determining distributees of a distribution of the direct mail information based on receiver attributes of the receivers, such that the desired condition of the sender for the receivers is satisfied by the receiver attribute of each of the distributees; and processing means for allowing the direct mail information to be distributed from the sender to the distributees when the information attribute satisfies the desired condition for the direct mail information as designated by the distributees.

2. The information providing apparatus as set forth in claim 1, wherein said inputting means is adapted for inputting a predetermined maximum transmission number designated by the sender, and wherein said processing means is adapted for prohibiting information that exceeds the maximum transmission number from being distributed.

3. The information providing apparatus as set forth in claim 1, wherein said inputting means is adapted for inputting a plurality of desired conditions for the receivers, and wherein said determining means is adapted for selecting at least one of the distributees from among the receivers based on a combination of the desired conditions for the receivers.

4. The information providing apparatus as set forth in claim 1, wherein said inputting means is adapted for inputting the receiver attribute including personal information of the one of the receivers, and wherein said processing means is adapted for assuring the anonymity of the personal information from the sender.

5. The information providing apparatus as set forth in claim 1, further comprising storing means for storing the information reception requirements, and wherein said inputting means is adapted for inputting information of at least one of age, sex, residential area, and action range of the one of the receivers, as the receiver attribute.

6. The information providing apparatus as set forth in claim 1, wherein said inputting means is adapted for inputting position information of a current position of the one of the receivers as the receiver attribute, and wherein said determining means is adapted for selecting at least one of the distributees from among the receivers based on the position information.

7. The information providing apparatus as set forth in claim 1, wherein said inputting means is adapted for inputting at least one distributing mode selected by the one of the receivers from conventional mail and network media including facsimile data, voice mail, electronic mail, and video-on-demand data, and wherein said processing means is adapted for outputting an instruction for distributing the direct mail information in the selected distributing mode.

8. The information providing apparatus as set forth in claim 1, further comprising: distributing means for automatically distributing the direct mail information from the sender to the distributees, wherein said distributing means is adapted for automatically distributing the direct mail information allowed by said processing means when said inputting means changes one of the information reception requirements.

9. The information providing apparatus as set forth in claim 1,
- further comprising distributing means for automatically distributing the direct mail information from the sender to the distributees, and
- wherein said distributing means is adapted for automatically distributing permitted information allowed by said processing means when said inputting means inputs a new information reception requirement of the one of the receivers.

10. The information providing apparatus as set forth in claim 1,
- further comprising:
  - storing means for storing the direct mail information related to at least one of commodities and services; and
  - distributing means for distributing the direct mail information to terminals of the distributees,
- wherein said inputting means receives first type information of a commodity or a service designated by one of the distributees from predetermined commodity or service category information, and
- wherein said processing means selects the direct mail information of the commodity or service from the direct mail information in said storing means, corresponding to the first type information, for said distributing means to distribute the selected direct mail information to a terminal of the one of the distributees.

11. The information providing apparatus as set forth in claim 10,
- further comprising storing means for storing a commodity/service category table corresponding to the category information, and
- wherein said processing means is adapted for displaying the commodity/service category table on the terminal of the one of the distributees and adding second type information that is not included in the commodity/service category table to the commodity/service category table when the one of the distributees designates the second type information.

12. The information providing apparatus as set forth in claim 10,
- further comprising storing means for storing a commodity/service category table corresponding to the category information and the number of pieces of direct mail information distributed in a predetermined period,
- wherein said processing means is adapted for displaying the number of pieces of the direct mail information corresponding to the first type information on the terminal of the one of the distributees.

13. The information providing apparatus as set forth in claim 10,
- further comprising: storing means for storing a thesaurus table corresponding to the category information,
- wherein said processing means is adapted for retrieving the thesaurus table with a key of the first type information and selecting the direct mail information corresponding to the result retrieved from the thesaurus table.

14. The information providing apparatus as set forth in claim 10,
- wherein said inputting means is adapted for inputting sender identification information of a particular sender designated by the one of the receivers, and
- wherein said processing means is adapted for prohibiting the distribution of particular direct mail information among the direct mail information corresponding to the first type information, the particular direct mail information being received from the particular sender corresponding to the sender identification information.

15. The information providing apparatus as set forth in claim 10,
- further comprising storing means for storing third type information designated by one of the receivers,
- wherein said processing means is adapted for selecting the direct mail information using the third type information as the first type information.

16. The information providing apparatus as set forth in claim 10,
- further comprising storing means for storing attribute information of the one of the distributees,
- wherein said processing means is adapted for retrieving fourth type information designated by one of the receivers having the same attribute information as the attribute information stored in said storing means and selecting the direct mail information using the fourth type information as the first type information.

17. The information providing apparatus as set forth in claim 10,
- wherein said processing means is adapted for providing the one of the distributees with at least one piece of standard type information, and
- wherein said inputting means is adapted for selecting the direct mail information using fifth type information selected from the standard type information selected by the one of the distributees as the first type information.

18. The information providing apparatus as set forth in claim 10,
- further comprising storing means for storing attribute information of the one of the distributees,
- wherein said processing means is adapted for selecting the direct mail information when a piece of the attribute information of the one of the distributees accords with the desired condition of the sender of the direct mail information corresponding to the first type information, and
- wherein said distributing means is adapted for displaying the piece of the attribute information corresponding to the desired condition of the sender and the direct mail information on the terminal of the one of the distributees.

19. The information providing apparatus as set forth in claim 1,
- further comprising distributing means for distributing direct mail information to terminals of the distributees,
- wherein said inputting means inputs a dividing condition for dividing distribution of the direct mail information for the distributees into a plurality of sessions, each session used for a distribution to at least one distributee, and
- wherein said distributing means distributes the direct mail information in the plurality of sessions, the number of which is determined corresponding to the dividing condition.

20. The information providing apparatus as recited in claim 1, further comprising:
- storing means for storing a profile of the sender, obtained from a sender terminal, representing at least one of a description of the sender and a summary of a commodity or a service; and
- distributing means for distributing the profile of the sender along with direct mail information to terminals of the distributees when the sender initially sends the direct mail information to the terminals of the distributees.

21. The information providing apparatus as set forth in claim 1, wherein said inputting means receives from the sender a validation period of a transmission of the direct mail information, the validation period being designated by the sender using predetermined units, and wherein said processing means prohibits the distribution of the direct mail information when the validation period has expired.

22. The information providing apparatus as set forth in claim 1, wherein said inputting means inputs a reception restriction for designating the amount of direct mail information to be received in a predetermined period, and wherein said processing means allows the distribution of the direct mail information in the range of the reception restriction.

23. The information providing apparatus as set forth in claim 22, wherein said processing means is adapted for performing one of a process for prohibiting the distribution of excessive direct mail information that exceeds the reception restriction, a process for distributing the excessive direct mail information the next day or later, and a process for distributing a part of the excessive direct mail information.

24. The information providing apparatus as set forth in claim 23, wherein said inputting means is adapted for inputting a reception restriction period designated by the one of the receivers and a validation period of the direct mail information, the validation period being designated by the sender, and wherein said processing means is adapted for allowing the distribution of direct mail information whose validation period has expired in the reception restriction period, regardless of the reception restriction.

25. An information providing apparatus for use in an information processing system for distributing direct mail information from a sender to receivers, comprising:

inputting means for inputting at least one type of direct mail information that each of the receivers wants and a plurality of types that the sender designates; and processing means for comparing the at least one type of direct mail information that each of the receivers wants with a combination of the plurality of types using an aggregate expression composed of the plurality of types and selecting at least one distributee, who wants direct mail information corresponding to the combination, from among the receivers.

26. The information providing apparatus as set forth in claim 25, wherein said processing means is adapted for displaying a commodity/service category table classifying commodities or services and statistical information representing one of the number and an attribute of receivers who want to receive direct mail information corresponding to a particular type of category in the commodity/service category table on a sender terminal.

27. An information providing apparatus for use in an information processing system having a host computer for distributing direct mail information from a sender terminal to a receiver at a receiver terminal via a network, comprising:

confirming means for electronically confirming that the receiver has received the direct mail information and displayed the content thereof on a screen of the receiver terminal; and generating means for automatically generating confirmation information representing that the receiver has performed an access operation to display the content of the direct mail information, and for sending the confirmation information from the receiver terminal to one of the host computer and the sender terminal.

28. The information providing apparatus as set forth in claim 27, wherein said generating means is adapted for sending at least one of reception information that represents that the receiver terminal has received the direct mail information and a response of the receiver against the direct mail information to the sender terminal through the host computer.

29. The information providing apparatus as set forth in claim 27, further comprising:

charging means for charging the sender an additional fee when the information providing apparatus receives the confirmation information.

30. A computer-readable recording medium used by a computer performing information processing in a network that connects a sender terminal and a receiver terminal, and used to direct the computer to perform a process comprising:

inputting information reception requirements and an information transmission requirement, each information reception requirement designated by one of a plurality of receivers and including a receiver attribute of the one of the receivers and a desired condition of the one of the receivers for direct mail information, the information transmission requirement including an information attribute of the direct mail information and a desired condition of the sender for the receivers, the information transmission requirement being designated by the sender;

narrowing a selection of receivers based on receiver attributes of the receivers and the desired condition of the sender for the receivers;

determining distributees of a narrowed selection of the receivers for a distribution of the direct mail information, each receiver attribute of each of the distributees satisfying the desired condition of the sender for the receivers; and allowing the information to be distributed from the sender to the distributees when the information attribute satisfies the desired condition for the direct mail information as designated by the distributees.

31. An information providing method of distributing information from a sender to receivers, comprising:

generating information reception requirements, each including a receiver attribute of one of the receivers and a desired condition of the one of the receivers for direct mail information being sent;

generating an information transmission requirement including an information attribute of the direct mail information being sent and a desired condition of the sender for the receivers;

narrowing a selection of receivers based on receiver attributes of the receivers and the desired condition of the sender for the receivers;

determining distributees of a narrowed selection of the receivers for a distribution of the direct mail information, each receiver attribute of each of the distributees satisfying the desired condition of the sender for the receivers; and distributing the direct mail information from the sender to the distributees when the information attribute satisfies the desired condition for the direct mail information as designated by the distributees.

* * * * *